US012645717B2

(12) United States Patent (10) Patent No.: US 12,645,717 B2

McCarty et al. (45) Date of Patent: *Jun. 2, 2026

(54) METHODS AND SYSTEMS FOR PLAYING BACK INDEXED CONVERSATIONS BASED ON THE PRESENCE OF OTHER PEOPLE

(71) Applicant: Adeia Guides Inc., San Jose, CA (US)

(72) Inventors: Michael McCarty, Agoura Hills, CA (US); Glen E. Roe, Simi Valley, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,259

(22) Filed: Mar. 12, 2024

(65) Prior Publication Data

US 2025/0005059 A1 Jan. 2, 2025

Related U.S. Application Data

(63) Continuation of application No. 17/031,266, filed on Sep. 24, 2020, now Pat. No. 11,960,516, which is a (Continued)

(51) Int. Cl.
    *G06F 16/334* (2025.01)
    *G06F 16/335* (2019.01)
          (Continued)

(52) U.S. Cl.
    CPC ........ *G06F 16/3344* (2019.01); *G06F 16/335* (2019.01); *G06F 16/686* (2019.01); *G06F 16/9535* (2019.01)

(58) Field of Classification Search
    CPC ............. G06F 16/9537; G06F 16/9535; G06F 16/686; G06F 16/335; G06F 16/3344
    See application file for complete search history.

(56) References Cited

U.S. PATENT DOCUMENTS 6,239,794 B1   5/2001   Yuen et al.
6,564,378 B1   5/2003   Satterfield et al.
        (Continued)

FOREIGN PATENT DOCUMENTS

CN      106949600 A   7/2017

OTHER PUBLICATIONS

"IPRP", International Preliminary Report on Patentability PCT/2018/039012 dated Jan. 28, 2020.

(Continued)

*Primary Examiner* — Miranda Le
(74) *Attorney, Agent, or Firm* — HG LAW LLP

(57) ABSTRACT

Methods and systems are provided herein for playing back indexed conversations based on the presence of other people. When a user asks a query, the system monitors the area, determines the other users in the area, and searches its database for a conversation that addresses the query in consideration of the other users present in the area. The system filters the indexed conversations to find conversations that included all the users present and determines the best matching conversation based on the words of the query as well as the keywords from the conversation. Once the system has determined the best match conversation, the system plays back the conversation to the user.

6 Claims, 16 Drawing Sheets

Related U.S. Application Data continuation of application No. 15/660,356, filed on Jul. 26, 2017, now Pat. No. 10,817,553.

(51) Int. Cl.
*G06F 16/68* (2019.01)
*G06F 16/9535* (2019.01)

(56) References Cited

U.S. PATENT DOCUMENTS

| | | | |
|---|---|---|---|
| 7,165,098 B1 | 1/2007 | Boyer et al. | |
| 7,761,892 B2 | 7/2010 | Ellis et al. | |
| 7,991,607 B2 | 8/2011 | Zhang et al. | |
| 8,046,801 B2 | 10/2011 | Ellis et al. | |
| 8,510,399 B1 | 8/2013 | Byttow et al. | |
| 9,213,558 B2 | 12/2015 | Tur et al. | |
| 9,317,713 B2 | 4/2016 | Wong et al. | |
| 9,318,113 B2 | 4/2016 | Westby et al. | |
| 9,390,706 B2 | 7/2016 | Gustafson et al. | |
| 9,405,741 B1 | 8/2016 | Schaaf et al. | |
| 9,456,070 B2 | 9/2016 | Li | |
| 9,461,970 B2 | 10/2016 | Biswas et al. | |
| 10,091,140 B2 * | 10/2018 | Galley | G06N 3/044 |
| 10,127,926 B2 * | 11/2018 | James | H04W 12/06 |
| 10,237,280 B2 * | 3/2019 | Day, II | H04L 63/102 |
| 10,347,245 B2 * | 7/2019 | Stahl | G10L 15/19 |
| 11,544,274 B2 * | 1/2023 | Yazdian | G06Q 10/10 |
| 11,960,516 B2 | 4/2024 | Mccarty et al. | |
| 2002/0174430 A1 | 11/2002 | Ellis et al. | |
| 2003/0032447 A1 | 2/2003 | Bulthuis | |
| 2005/0251827 A1 | 11/2005 | Ellis et al. | |
| 2007/0100790 A1 | 5/2007 | Cheyer et al. | |
| 2010/0153885 A1 | 6/2010 | Yates | |
| 2010/0241700 A1 | 9/2010 | Rasmussen et al. | |
| 2011/0282669 A1 | 11/2011 | Michaelis | |
| 2011/0320273 A1 | 12/2011 | Miranda-Steiner | |
| 2012/0221965 A1 | 8/2012 | Takeyoshi et al. | |
| 2012/0329475 A1 | 12/2012 | Ribaudo et al. | |
| 2013/0317808 A1 | 11/2013 | Kruel et al. | |
| 2014/0025702 A1 | 1/2014 | Curtiss et al. | |
| 2014/0053228 A1 | 2/2014 | Mahadevan et al. | |
| 2014/0157424 A1 | 6/2014 | Lee et al. | |
| 2014/0282205 A1 | 9/2014 | Teplitsky et al. | |
| 2014/0337266 A1 | 11/2014 | Kalns et al. | |
| 2015/0149182 A1 | 5/2015 | Kalns et al. | |
| 2015/0189378 A1 | 7/2015 | Soundararajan et al. | |
| 2015/0234939 A1 | 8/2015 | Aharony et al. | |
| 2015/0254061 A1 | 9/2015 | Gelfenbeyn et al. | |
| 2015/0279115 A1 | 10/2015 | Vukicevic | |
| 2016/0033280 A1 | 2/2016 | Moore et al. | |
| 2016/0057181 A1 | 2/2016 | Henning et al. | |
| 2016/0104481 A1 | 4/2016 | Ehsani et al. | |
| 2016/0195402 A1 | 7/2016 | Adderly et al. | |
| 2016/0300388 A1 * | 10/2016 | Stafford | A63F 13/69 |
| 2016/0300570 A1 | 10/2016 | Gustafson et al. | |
| 2017/0103082 A1 | 4/2017 | Hawker et al. | |
| 2017/0206421 A1 | 7/2017 | Pandey et al. | |
| 2017/0340256 A1 * | 11/2017 | Suskind | A63F 13/352 |
| 2018/0039647 A1 | 2/2018 | Winstanley et al. | |
| 2018/0039691 A1 | 2/2018 | Hazra et al. | |

OTHER PUBLICATIONS

"ISR and Written Opinion", International Search Report and Written Opinion of PCT/2018/039012 dated Sep. 12, 2018.

* cited by examiner

202 Database of Indexed Conversations

| Conversation | Keywords | Participants |
|---|---|---|
| "Let's Plan to have Dinner on Friday" 204 | "Plan" "Dinner" "Friday" 210 | Bill Bob Joe 212 |
| "Bob is so Annoying" 206 | "Bob" "Annoying" | Bill Joe |
| "Are You Free to Watch the Game on Saturday" , "No, I have to Meet Sarah" 208 | "Game" "Saturday" "Sarah" | Bob Bill |

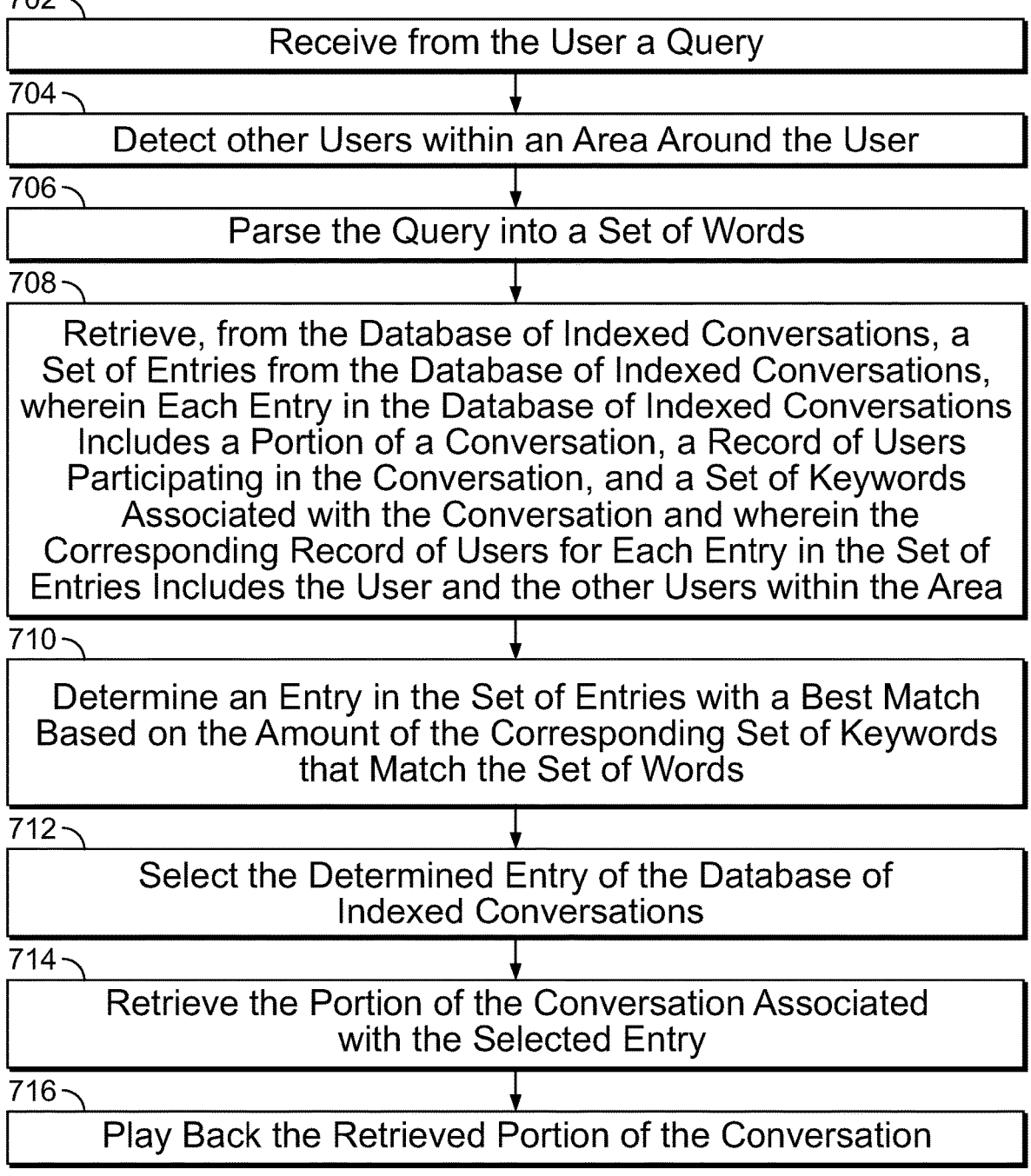

702 ⌐ 
| Receive from the User a Query |

704 ⌐ 
| Detect other Users within an Area Around the User |

706 ⌐ 
| Parse the Query into a Set of Words |

708 ⌐ 
| Retrieve, from the Database of Indexed Conversations, a Set of Entries from the Database of Indexed Conversations, wherein Each Entry in the Database of Indexed Conversations Includes a Portion of a Conversation, a Record of Users Participating in the Conversation, and a Set of Keywords Associated with the Conversation and wherein the Corresponding Record of Users for Each Entry in the Set of Entries Includes the User and the other Users within the Area |

710 ⌐ 
| Determine an Entry in the Set of Entries with a Best Match Based on the Amount of the Corresponding Set of Keywords that Match the Set of Words |

712 ⌐ 
| Select the Determined Entry of the Database of Indexed Conversations |

714 ⌐ 
| Retrieve the Portion of the Conversation Associated with the Selected Entry |

716 ⌐ 
| Play Back the Retrieved Portion of the Conversation |

FIG. 7

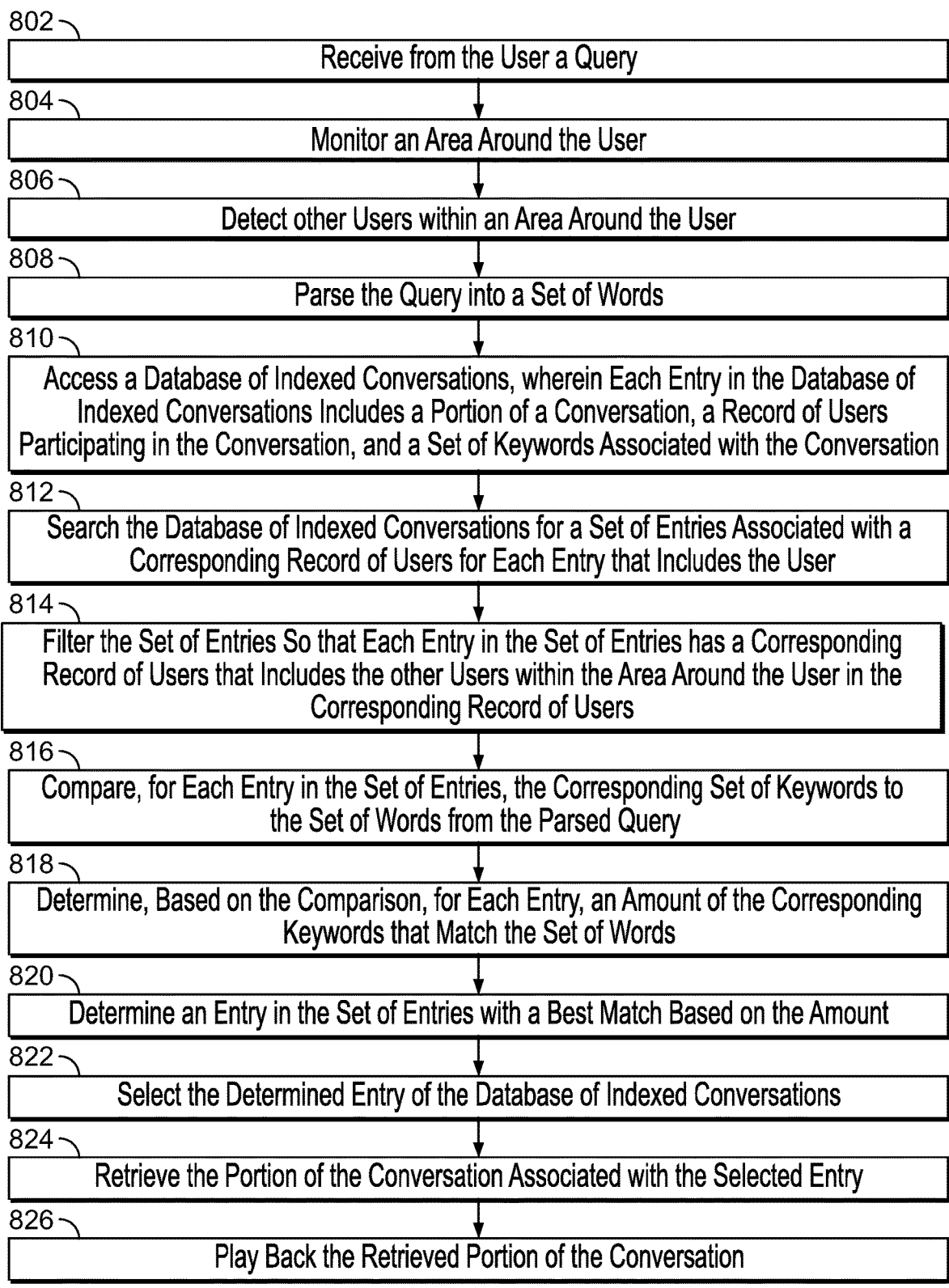

802 —
Receive from the User a Query

804 —
Monitor an Area Around the User

806 —
Detect other Users within an Area Around the User

808 —
Parse the Query into a Set of Words

810 —
Access a Database of Indexed Conversations, wherein Each Entry in the Database of Indexed Conversations Includes a Portion of a Conversation, a Record of Users Participating in the Conversation, and a Set of Keywords Associated with the Conversation 812 —
Search the Database of Indexed Conversations for a Set of Entries Associated with a Corresponding Record of Users for Each Entry that Includes the User 814 —
Filter the Set of Entries So that Each Entry in the Set of Entries has a Corresponding Record of Users that Includes the other Users within the Area Around the User in the Corresponding Record of Users 816 —
Compare, for Each Entry in the Set of Entries, the Corresponding Set of Keywords to the Set of Words from the Parsed Query 818 —
Determine, Based on the Comparison, for Each Entry, an Amount of the Corresponding Keywords that Match the Set of Words 820 —
Determine an Entry in the Set of Entries with a Best Match Based on the Amount 822 —
Select the Determined Entry of the Database of Indexed Conversations 824 —
Retrieve the Portion of the Conversation Associated with the Selected Entry 826 —
Play Back the Retrieved Portion of the Conversation

FIG. 8

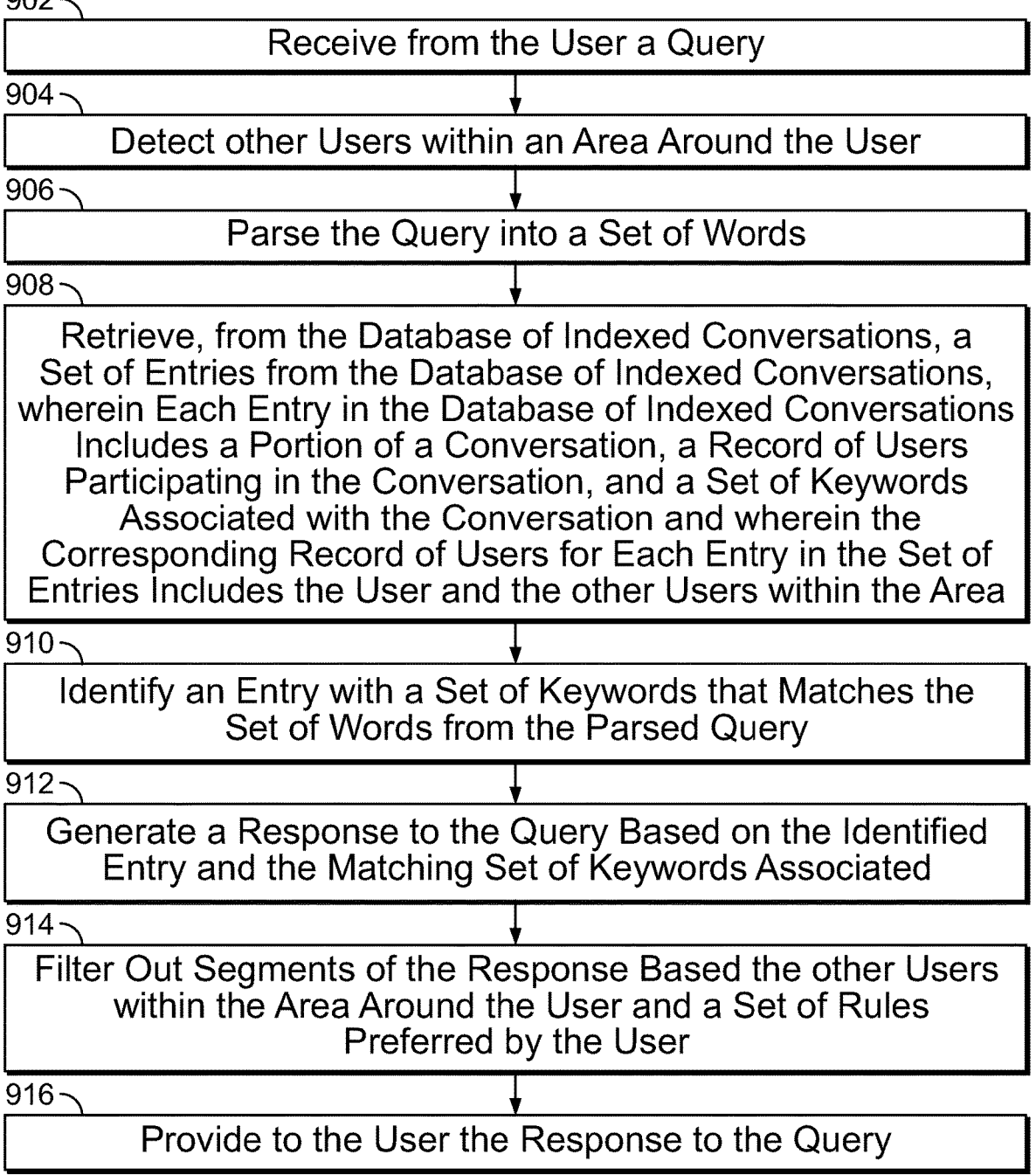

902 — Receive from the User a Query

904 — Detect other Users within an Area Around the User

906 — Parse the Query into a Set of Words

908 — Retrieve, from the Database of Indexed Conversations, a Set of Entries from the Database of Indexed Conversations, wherein Each Entry in the Database of Indexed Conversations Includes a Portion of a Conversation, a Record of Users Participating in the Conversation, and a Set of Keywords Associated with the Conversation and wherein the Corresponding Record of Users for Each Entry in the Set of Entries Includes the User and the other Users within the Area 910 — Identify an Entry with a Set of Keywords that Matches the Set of Words from the Parsed Query 912 — Generate a Response to the Query Based on the Identified Entry and the Matching Set of Keywords Associated 914 — Filter Out Segments of the Response Based the other Users within the Area Around the User and a Set of Rules Preferred by the User 916 — Provide to the User the Response to the Query

FIG. 9

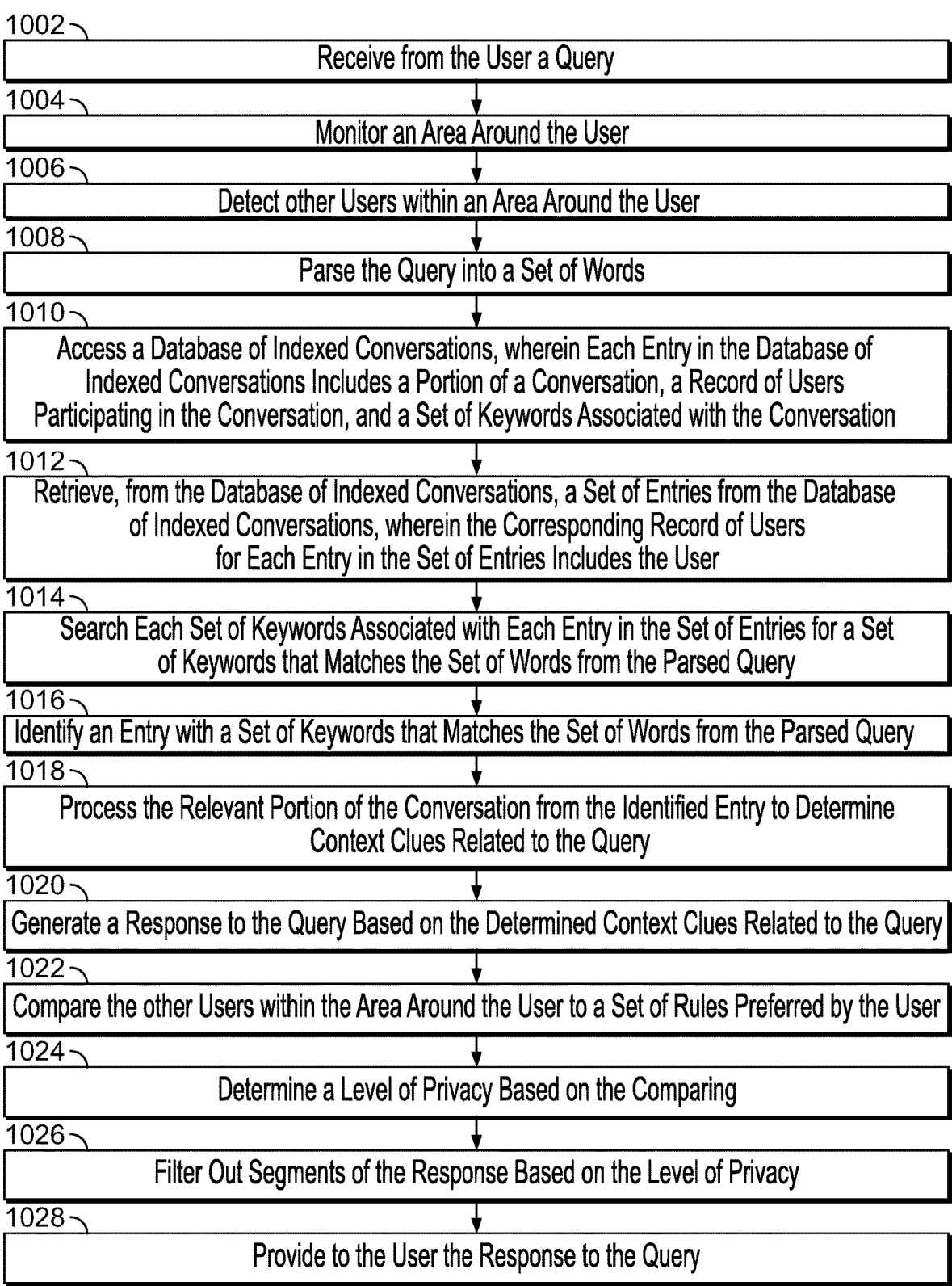

1002 ┐
| Receive from the User a Query |

1004 ┐
| Monitor an Area Around the User |

1006 ┐
| Detect other Users within an Area Around the User |

1008 ┐
| Parse the Query into a Set of Words |

1010 ┐
| Access a Database of Indexed Conversations, wherein Each Entry in the Database of Indexed Conversations Includes a Portion of a Conversation, a Record of Users Participating in the Conversation, and a Set of Keywords Associated with the Conversation |

1012 ┐
| Retrieve, from the Database of Indexed Conversations, a Set of Entries from the Database of Indexed Conversations, wherein the Corresponding Record of Users for Each Entry in the Set of Entries Includes the User |

1014 ┐
| Search Each Set of Keywords Associated with Each Entry in the Set of Entries for a Set of Keywords that Matches the Set of Words from the Parsed Query |

1016 ┐
| Identify an Entry with a Set of Keywords that Matches the Set of Words from the Parsed Query |

1018 ┐
| Process the Relevant Portion of the Conversation from the Identified Entry to Determine Context Clues Related to the Query |

1020 ┐
| Generate a Response to the Query Based on the Determined Context Clues Related to the Query |

1022 ┐
| Compare the other Users within the Area Around the User to a Set of Rules Preferred by the User |

1024 ┐
| Determine a Level of Privacy Based on the Comparing |

1026 ┐
| Filter Out Segments of the Response Based on the Level of Privacy |

1028 ┐
| Provide to the User the Response to the Query |

Receive an Indication that the User Intends to Provide a Query

1104

Terminate Recording of Conversation of the User

1106

Record Query Provided by the User

1108

Process Query into a Set of Words

1110

Tag Each Word of the Set of Words as a Part of Speech or Category

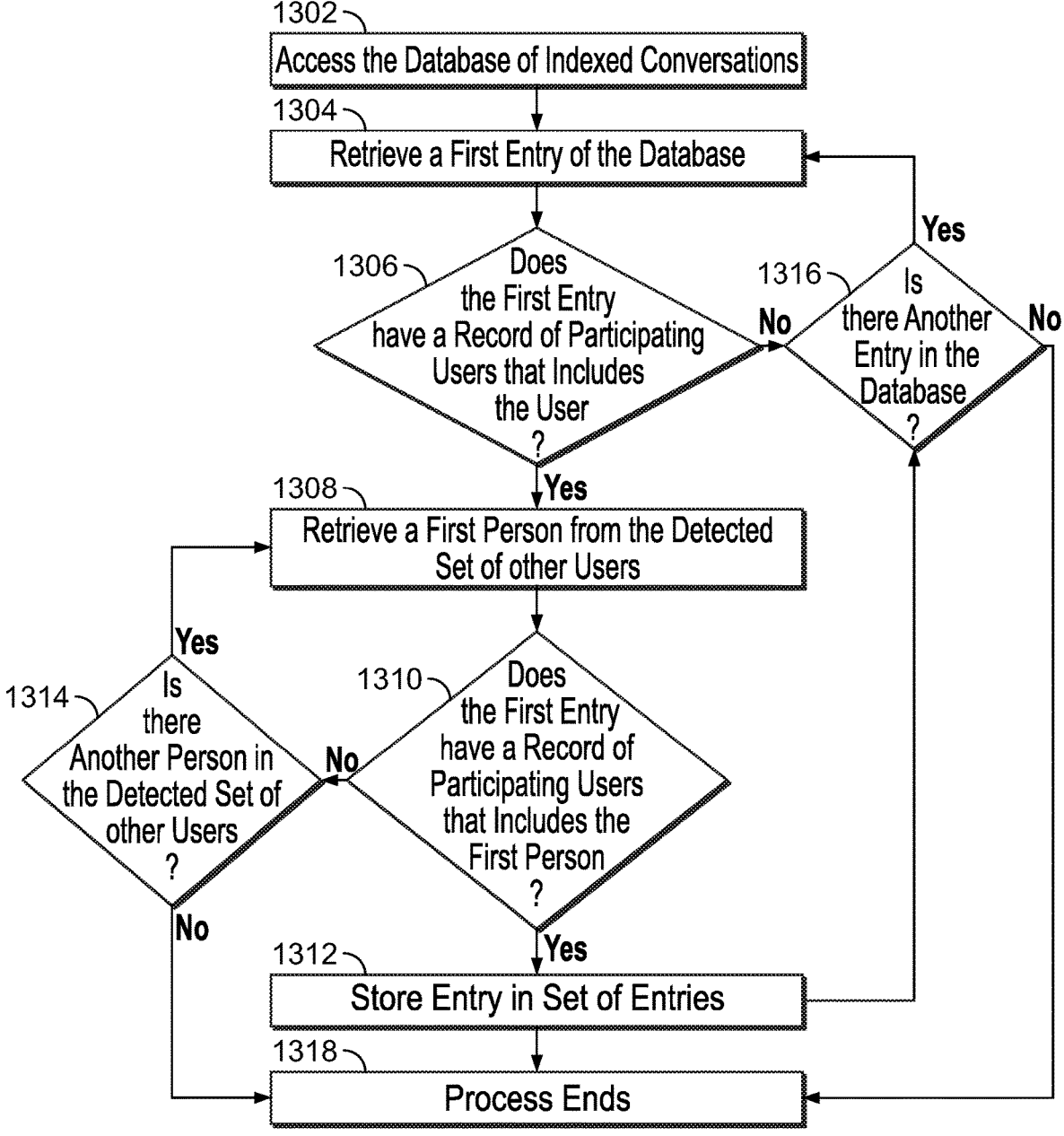

1302 — Access the Database of Indexed Conversations

1304 — Retrieve a First Entry of the Database

1306 — Does the First Entry have a Record of Participating Users that Includes the User ?

No

1316 — Is there Another Entry in the Database ? Yes / No

Yes

1308 — Retrieve a First Person from the Detected Set of other Users

1314 — Is there Another Person in the Detected Set of other Users ? Yes / No

1310 — Does the First Entry have a Record of Participating Users that Includes the First Person ? No / Yes

1312 — Store Entry in Set of Entries

1318 — Process Ends

FIG. 13

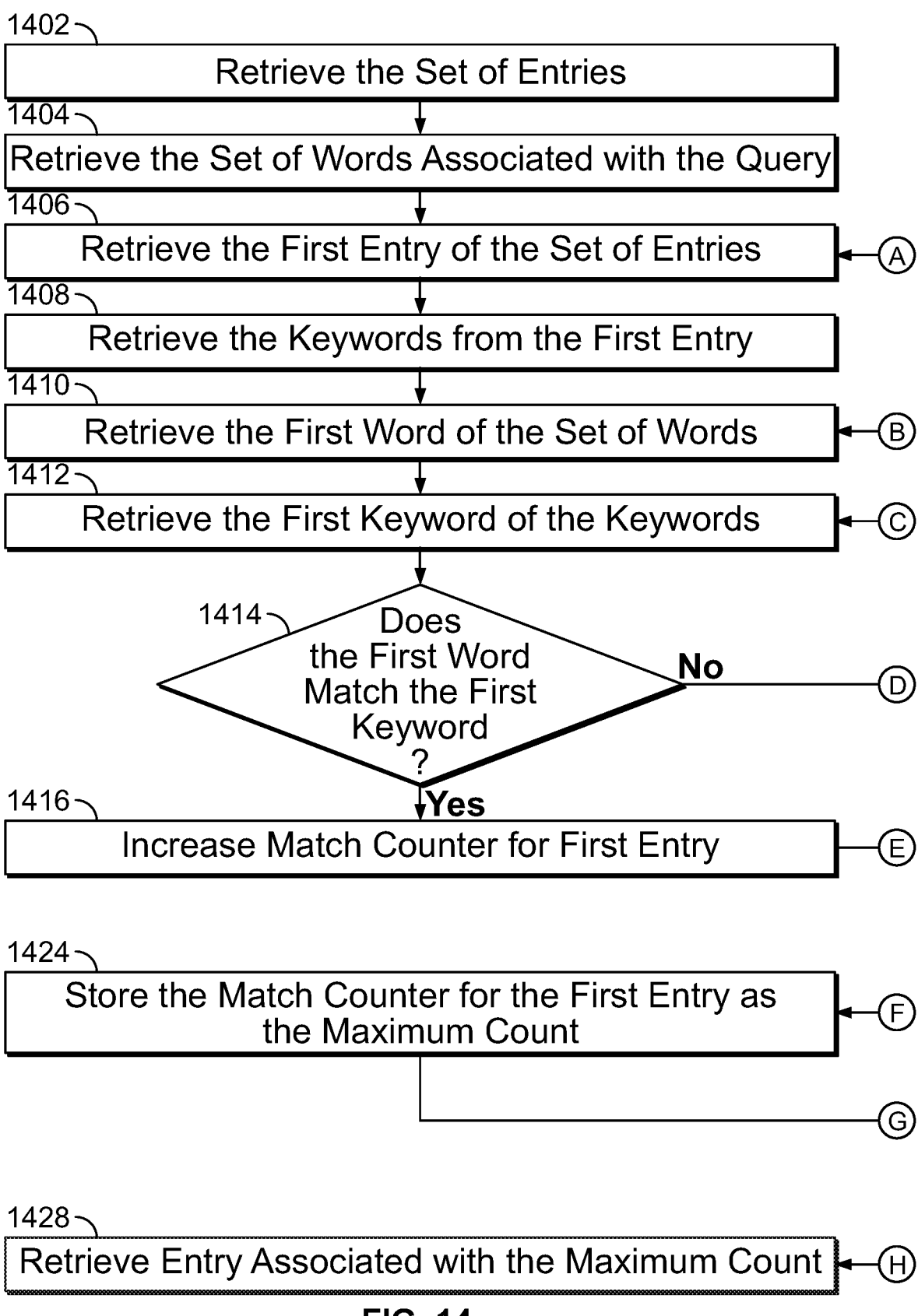

1402
Retrieve the Set of Entries

1404
Retrieve the Set of Words Associated with the Query

1406
Retrieve the First Entry of the Set of Entries ◀—Ⓐ

1408
Retrieve the Keywords from the First Entry

1410
Retrieve the First Word of the Set of Words ◀—Ⓑ

1412
Retrieve the First Keyword of the Keywords ◀—Ⓒ

1414
Does the First Word Match the First Keyword ?

No —Ⓓ

Yes

1416
Increase Match Counter for First Entry —Ⓔ

1424
Store the Match Counter for the First Entry as the Maximum Count ◀—Ⓕ

—Ⓖ

1428
Retrieve Entry Associated with the Maximum Count ◀—Ⓗ

FIG. 14

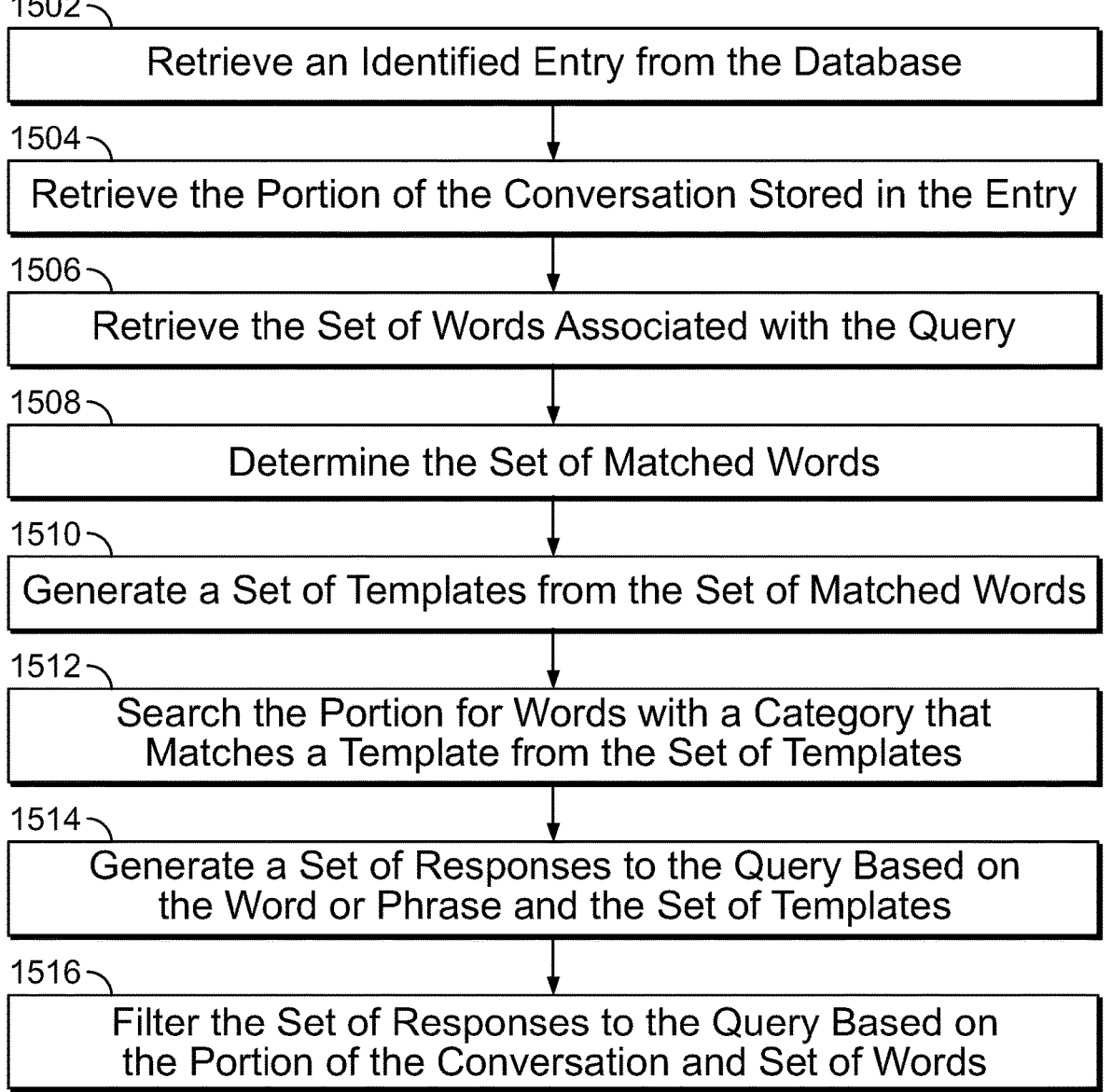

1502 — Retrieve an Identified Entry from the Database

1504 — Retrieve the Portion of the Conversation Stored in the Entry

1506 — Retrieve the Set of Words Associated with the Query

1508 — Determine the Set of Matched Words

1510 — Generate a Set of Templates from the Set of Matched Words

1512 — Search the Portion for Words with a Category that Matches a Template from the Set of Templates 1514 — Generate a Set of Responses to the Query Based on the Word or Phrase and the Set of Templates 1516 — Filter the Set of Responses to the Query Based on the Portion of the Conversation and Set of Words

FIG. 15

METHODS AND SYSTEMS FOR PLAYING BACK INDEXED CONVERSATIONS BASED ON THE PRESENCE OF OTHER PEOPLE

CROSS-REFERENCE TO RELATED APPLICATIONS

This application is a continuation of U.S. patent application Ser. No. 17/031,266, filed Sep. 24, 2020, which is a continuation of U.S. patent application Ser. No. 15/660,356, filed Jul. 26, 2017, now U.S. Pat. No. 10,817,553, the disclosures of which are hereby incorporated by reference herein in their entireties.

BACKGROUND

With intelligent personal assistants, like Amazon Alexa or Google Home, users are now able to ask for information without accessing a screen or personal device. These personal assistants listen to the users throughout the day and provide information when asked. However, these assistants answer the questions without considering the other people nearby. When a user asks a question about scheduled events or memos which may include sensitive information, the personal assistants provide the information regardless of whether all people in the room are the intended recipients of that information. The assistants lack the ability to filter out some more sensitive information based on the other users in the area.

SUMMARY

Methods and systems are provided herein for playing back indexed conversations based on the presence of other people. When a user asks a query, the system monitors the area, determines the other users in the area, and searches its database for a conversation that addresses the query in consideration of the other users present in the area. The system filters the indexed conversations to find conversations that included all the users present and determines the best matching conversation based on the words of the query as well as the keywords from the conversation. Once the system has determined the best match conversation, the system plays back the conversation to the user.

In some aspects, the media guidance application receives from the user a query and monitors an area around the user. For example, the media guidance application may record the users that enter and exit an area via camera or by tracking the user's personal devices to find that users Bob and Joe are in the area. The area around the user may be a specific room or designated location or simply a threshold distance around the user. The area around the user may be within a vehicle such as a car. The media guidance application detects other users within the area around the user. For example, the media guidance application may detect that Bob is within a certain specified distance of Joe. The media guidance application parses the query into a set of words. For example, Joe's query may be "What are my plans for Friday?" may be parsed into a set of words including "what", "my", "plans", "Friday".

The media guidance application accesses a database of indexed conversations. Each entry in the database of indexed conversations includes a portion of a conversation, a record of users participating in the conversation, and a set of keywords associated with the conversation. In some embodiments, the portions of conversations may be conversations previously recorded by the media guidance application. In some embodiments, the portions of conversations may also be conversations recorded and uploaded by a user. For example, the media guidance application may have an entry with a portion of conversation that includes the words "Let's plan to have dinner on Friday night. Yes, that works," a list of keywords such as plan, dinner, Friday, and a list of participants such as Bill, Bob, and Joe.

The media guidance application searches the database of indexed conversations for a set of entries associated with a corresponding record of users for each entry that includes the user. For example, the media guidance application may search the entries for all the entries that list Joe as a participant.

The media guidance application filters the set of entries so that each entry in the set of entries has a corresponding record of users that includes the other users within the area around the user in the corresponding record of users. For example, the media guidance application may filter the entries to find the entries that also have Bob as a participant.

The media guidance application compares, for each entry in the set of entries, the corresponding set of keywords to the set of words from the parsed query. For example, the media guidance application may compare the keywords of plan, dinner, and Friday, to the parsed query with words "what", "my", "plans", "Friday". The media guidance application determines, based on the comparison, for each entry, an amount of the corresponding keywords that match the set of words. For example, the media guidance application determines that plans and Friday from the query match plan and Friday from the entry.

The media guidance application determines an entry in the set of entries with a best match based on the amount. For example, the media guidance application determines that this entry with matching keywords of plan and Friday is the best match entry. The media guidance application selects the determined entry of the database of indexed conversations. The media guidance application retrieves the portion of the conversation associated with the selected entry. For example, the media guidance application retrieves the conversation portion of "Let's plan to have dinner on Friday night. Yes, that works." The media guidance application plays back the retrieved portion of the conversation. For example, the media guidance application may play back that portion to Joe on Joe's user device.

In some embodiments, the media guidance application determines a required level of privacy based the other users within the area around the user and a set of rules. The media guidance application may determine the level of privacy based on whether any of the other users within the area are below an age threshold. For example, if children are in the area a high level of privacy may be required in order to prevent inappropriate language and discussion of adult topics. The media guidance application may determine the level of privacy based on whether keywords that correspond to the selected entry in the set of entries meet the set of rules. For example, if there are sex-related keywords, a high level of privacy may be required. The media guidance application may determine the level of privacy based on whether identities of each of the other users meet the set of rules. For example, if Joe is planning a surprise birthday party for Bob, he may set a rule that nothing related to the party may be discussed in front of Bob.

In some embodiments, the media guidance application generates a response to the query based on the retrieved portion of the conversation and the corresponding keywords. For example, the media guidance application generates a response of "You have plans to have dinner on Friday". The media guidance application may generate a set of responses to the query based on the identified entry and the matching set of keywords associated, and may determine an appropriate response to the query from the set of responses that matches the determined level of privacy. For example, the media guidance application may generate multiple responses with varying levels of detail about plans for dinner, some of which include restaurants and times, and then determine that there are users in the room which did not participate in the original conversation and so not all of the details are appropriate for playback.

In some embodiments, the media guidance application may select part of the retrieved portion for playback based on the determined level of privacy. For example, the media guidance application may identify a portion of the playback such as "Let's plan to have dinner on Friday night." In some embodiments, each entry of the database of indexed conversations comprises links to supplemental information based on a set of keywords associated with a corresponding entry from the database. For example, an entry discussing plans for dinner at a restaurant may include links to the restaurant or a link to the electronic communication indicating the reservation for the dinner. The media guidance application may play back the retrieved portion of the conversation by providing the links to supplemental information of the entry to the user on a user device. For example, the media guidance application may provide in the playback the information about the reservation at the restaurant from the linked electronic communication in the entry.

In some aspects, the media guidance application receives from the user a query and monitors an area around the user. For example, the media guidance application may record the users that enter and exit an area via camera or by tracking the user's personal devices to find that users Bob and Joe are in the area. The area around the user may be a specific room or designated location or simply a threshold distance around the user. The area around the user may be within a vehicle such as a car. The media guidance application detects other users within the area around the user. For example, the media guidance application may detect that Bob is within a certain specified distance of Joe. The media guidance application parses the query into a set of words. For example, Joe's query may be "What are my plans for Friday?" may be parsed into a set of words including "what", "my", "plans", "Friday".

The media guidance application accesses a database of indexed conversations. Each entry in the database of indexed conversations includes a portion of a conversation, a record of users participating in the conversation, and a set of keywords associated with the conversation. In some embodiments, the portions of conversations may be conversations previously recorded by the media guidance application. In some embodiments, the portions of conversations may also be conversations recorded and uploaded by a user. For example, the media guidance application may have an entry with a portion of conversation that includes the words "Let's plan to have dinner on Friday night. Yes, that works," a list of keywords such as plan, dinner, Friday, and a list of participants such as Bill, Bob, and Joe.

The media guidance application retrieves, from the database of indexed conversations, a set of entries from the database of indexed conversations. The corresponding record of users for each entry in the set of entries includes the user. For example, the media guidance application may search the entries for all the entries that list Joe as a participant.

The media guidance application searches each set of keywords associated with each entry in the set of entries for a set of keywords that matches the set of words from the parsed query. For example, the media guidance application may search for entries that include keywords such as "plan" and "Friday" based on the words "what", "my", "plans", "Friday" from the query. The media guidance application identifies an entry with the matching set of keywords. For example, the media guidance application may identify an entry with the keywords "plan", "dinner", and "Friday".

The media guidance application processes the relevant portion of the conversation from the identified entry to determine context clues related to the query. For example, the media guidance application may process the conversation to find the portion stating "Let's plan to have dinner on Friday". The media guidance application generates a set of responses to the query based on the determined context clues related to the query. For example, the media guidance application may generate multiple responses with varying levels of detail about plans for dinner, some of which include restaurants and times, based on the conversation.

In some embodiments, the media guidance application processes the relevant portion of the conversation from the identified entry to determine context clues related to the query by retrieving the portion of the conversation from the entry, and retrieving the set of words. The media guidance application then determines a set of matched words based on the portion of the conversation and the set of matched words. The set of matched words includes the words that are included in both the set of words from the query as well as found in the portion of the conversation. For example, a set of matched words could be "plan" and "Friday". The media guidance application then generates a set of templates from the set of matched words, with each template in the set of templates requiring words of specific categories. The media guidance application may access a database of templates to generate a set of templates based on the matched words. Each template may be a generic response with blank spots tagged with specific categories of words to be filled in. For example, the word "plan" may generate the templates of "Yes, there is a plan on (day of week)" and "No, there is not a plan on (day of week)". The media guidance application may use the set of matched words together. For example, the words "plan" and "Friday" may also generate the template responses of "Yes, there are plans for (noun/activity) on Friday" and "No, there are no plans for (noun/activity) on Friday". Each template response may be tagged with a default privacy level. The media guidance application then searches the portion of the conversation for words with a category that match a required specific category for a template from the set of templates. For example, the media guidance application searches the portion of the conversation for a noun that is related to an activity and finds the word "dinner".

The media guidance application may generate the response to the query based on the determined context clues related to the query by generating a set of responses to the query based on the set of templates and the searched words with a category that matches the required specific category, and filtering the set of responses to the query based on the portion of the conversation and the set of words. For example, the media guidance application may generate a response "Yes, there are plans for dinner on Friday", "No, there are no plans for dinner on Friday", and "You plan to have dinner on Friday". The portion of the conversation "Let's have dinner on Friday" does not include a word in the negative category and so the response "No, there are no plans for dinner on Friday" is not appropriate. In another example, the set of words includes a question word "What" which is not associated with a yes/no answer and so "Yes, there are plans for dinner on Friday" is not appropriate. The media guidance application may identify specific segments of a response for possible filtering. For example, if the full response is "You plan to have dinner on Friday and then go home to have sex", the phrases "and then go home to have sex" or "to have sex" may be identified as segments of the response containing a known keyword that may be removed under a high privacy setting.

The media guidance application compares the other users within the area around the user to a set of rules. The media guidance application determines a level of privacy based on the comparing. The media guidance application may determine the level of privacy based on whether any of the other users within the area are below an age threshold. For example, if children are in the area a high level of privacy may be required in order to prevent inappropriate language and discussion of adult topics. The media guidance application may determine the level of privacy based on whether keywords corresponding to the selected entry in the set of entries meet the set of rules. For example, if there are sex-related keywords, a high level of privacy may be required. The media guidance application may determine the level of privacy based on whether identities of each of the other users meet the set of rules. For example, if Joe is planning a surprise birthday party for Bob, he may set a rule that nothing related to the party may be discussed in front of Bob. The media guidance application may determine the level of privacy based on whether the set of words meet the set of rules. For example, the query may include words relating to sex and so a high level of privacy may be required.

The media guidance application filters out segments of the response based the determined level of privacy. For example, the media guidance application may determine a high level of privacy is required due to the presence of users under a threshold age, and may then proceed to remove the segment "and then go home to have sex" from a response which would have otherwise been "You plan to have dinner on Friday and then go home to have sex". The media guidance application provides to the user the response to the query. For example, the media guidance application may play back the appropriate response on a user device.

In some embodiments, the media guidance application may select part of the retrieved portion for playback based on the determined level of privacy. For example, the media guidance application may identify a portion of the playback such as "Let's plan to have dinner on Friday night." In some embodiments, each entry of the database of indexed conversations comprises links to supplemental information based on a set of keywords associated with a corresponding entry from the database. For example, an entry discussing plans for dinner at a restaurant may include links to the restaurant or a link to the electronic communication indicating the reservation for the dinner. The media guidance application may play back the retrieved portion of the conversation by providing the links to supplemental information of the entry to the user on a user device. For example, the media guidance application may provide in the playback the information about the reservation at the restaurant from the linked electronic communication in the entry.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an illustrative embodiment of a database of indexed conversations, in accordance with some embodiments of the disclosure;

FIG. 7 is a flowchart of illustrative steps involved in playing back indexed conversations based on the presence of other people, in accordance with some embodiments of the disclosure;

FIG. 8 is another flowchart of illustrative steps involved in playing back indexed conversations based on the presence of other people, in accordance with some embodiments of the disclosure;

FIG. 9 is flowchart of illustrative steps involved in replying to queries based on indexed conversations and context, in accordance with some embodiments of the disclosure;

FIG. 10 is another flowchart of illustrative steps involved in replying to queries based on indexed conversations and context, in accordance with some embodiments of the disclosure;

FIG. 13 is a flowchart of illustrative steps involved in searching database of indexed conversations for a set of entries, in accordance with some embodiments of the disclosure;

FIG. 15 is a flowchart of illustrative steps involved in generating a set of response to the query, in accordance with some embodiments of the disclosure;

DETAILED DESCRIPTION

Figure 1A:
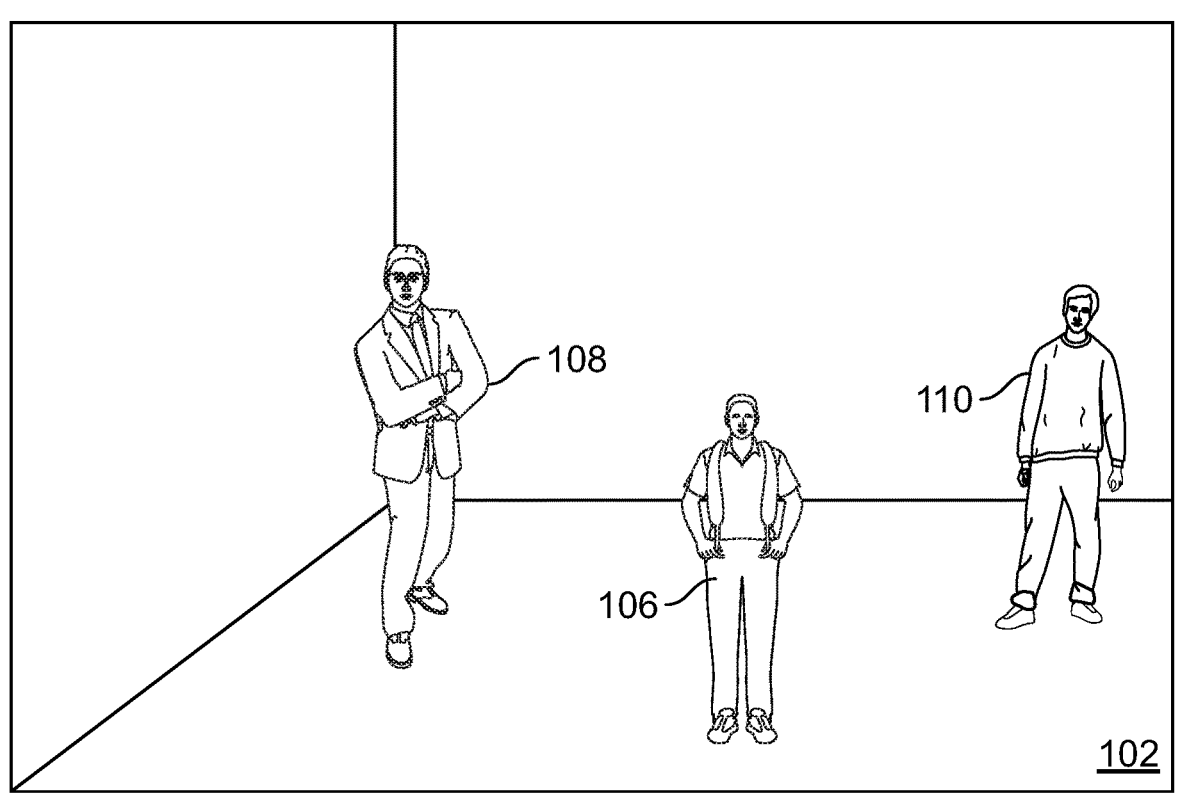
FIG. 1A and FIG. 1B show an illustrative embodiment of groups of users in an area, in accordance with some embodiments of the disclosure.

Methods and systems are provided herein for playing back indexed conversations based on the presence of other people. When a user asks a query, the system monitors the area, determines the other users in the area, and searches its database for a conversation that addresses the query in consideration of the other users present in the area. The system filters the indexed conversations to find conversations that included all the users present and determines the best matching conversation based on the words of the query as well as the keywords from the conversation. Once the system has determined the best match conversation, the system plays back the conversation to the user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 1B:
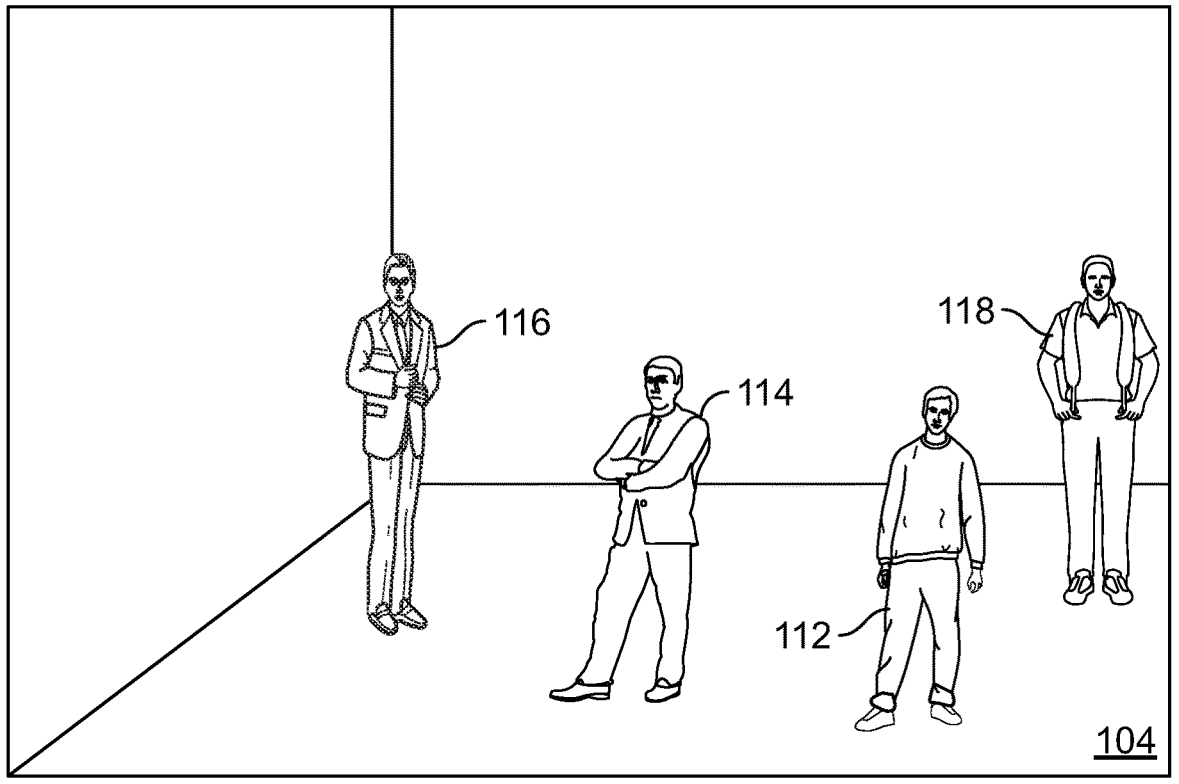

FIG. 1 shows an illustrative embodiment of groups of users in an area, in accordance with some embodiments of the disclosure. Area 102 and area 104 show the same room but with different groups of users. Users 104, 106, and 108 are in area 102 and users 110, 112, 114, and 116 are in area 104.

In some embodiments, the media guidance application receives from the user (e.g., user 106) a query and monitors an area around the user (e.g., area 102). For example, the media guidance application may record the users that enter and exit area 102 via camera or by tracking the user's personal devices to find that users Bob and Joe (e.g., users 104 and 106) are in area 102. The area around the user may be a specific room or designated location or simply a threshold distance around the user. The area around the user may be within a vehicle such as a car. The media guidance application detects other users within area 102. The area may refer to a region within a distance from a user (e.g., user 106) or a specified region. For example, the media guidance application may detect that Bob (e.g., user 108) is within a certain specified distance of Joe (e.g., user 106). The media guidance application parses the query into a set of words. For example, Joe's query may be "What are my plans for Friday?" may be parsed into a set of words including "what", "my", "plans", "Friday".

The media guidance application accesses a database of indexed conversations. Each entry in the database of indexed conversations includes a portion of a conversation, a record of users participating in the conversation, and a set of keywords associated with the conversation. In some embodiments, the portions of conversations may be conversations previously recorded by the media guidance application. In some embodiments, the portions of conversations may also be conversations recorded and uploaded by a user. For example, the media guidance application may have an entry with a portion of conversation that includes the words "Let's plan to have dinner on Friday night. Yes, that works," a list of keywords such as plan, dinner, Friday, and a list of participants such as Bill, Bob, and Joe. The conversations may be conversations that were recorded in areas 102 and 104 with records of participants of users that were within areas 102 and 104 at the time of the recording. For example, the conversation may be recorded in area 104 and users 110, 112, 114, and 116 may be included in the list of participants.

The media guidance application searches the database of indexed conversations for a set of entries associated with a corresponding record of users for each entry that includes the user. For example, the media guidance application may search the entries for all the entries that list Joe as a participant.

The media guidance application filters the set of entries so that each entry in the set of entries has a corresponding record of users that includes the other users within area 102 in the corresponding record of users. For example, the media guidance application may filter the entries to find the entries that also have Bob (e.g., user 108) as a participant.

The media guidance application compares, for each entry in the set of entries, the corresponding set of keywords to the set of words from the parsed query. For example, the media guidance application may compare the keywords of plan, dinner, and Friday, to the parsed query with words "what", "my", "plans", "Friday". The media guidance application determines, based on the comparison, for each entry, an amount of the corresponding keywords that match the set of words. For example, the media guidance application determines that plans and Friday from the query match plan and Friday from the entry.

The media guidance application determines an entry in the set of entries with a best match based on the amount. For example, the media guidance application determines that this entry with matching keywords of plan and Friday is the best match entry. The media guidance application selects the determined entry of the database of indexed conversations. The media guidance application retrieves the portion of the conversation associated with the selected entry. For example, the media guidance application retrieves the conversation portion of "Let's plan to have dinner on Friday night. Yes, that works." The media guidance application plays back the retrieved portion of the conversation. For example, the media guidance application may play back that portion to Joe on Joe's user device.

In some embodiments, the media guidance application determines a level of privacy based the other users (e.g., users 108 and 110) within the area 102 and a set of rules 106. The media guidance application may determine the level of privacy based on whether any of the other users (e.g., users

108 and 110) within the area 102 below an age threshold. For example, if children are in the area a high level of privacy may be required in order to prevent inappropriate language and discussion of adult topics. The media guidance application may determine the level of privacy based on whether keywords corresponding to the selected entry in the set of entries meet the set of rules 106. For example, if there are sex-related keywords, a high level of privacy may be required. The media guidance application may determine the level of privacy based on whether identities of each of the other users (e.g., users 108 and 110) meet the set of rules 106. For example, if Joe is planning a surprise birthday party for Bob, he may set a rule that nothing related to the party may be discussed in front of Bob.

In some embodiments, the media guidance application generates a response to the query based on the retrieved portion of the conversation and the corresponding keywords. For example, the media guidance application generates a response of "You have plans to have dinner on Friday". The media guidance application may generate a set of responses to the query based on the identified entry and the matching set of keywords associated, and determines an appropriate response to the query from the set of responses that matches the determined level of privacy. For example, the media guidance application may generate multiple responses with varying levels of detail about plans for dinner, some of which include restaurants and times, and then determine that there are users in the room which did not participate in the original conversation and so not all of the details are appropriate for playback.

In some embodiments, the media guidance application may select part of the retrieved portion for playback based on the determined level of privacy. For example, the media guidance application may identify a portion of the playback such as "Let's plan to have dinner on Friday night." In some embodiments, each entry of the database of indexed conversations comprises links to supplemental information based on a set of keywords associated with a corresponding entry from the database. For example, an entry discussing plans for dinner at a restaurant may include links to the restaurant or a link to the electronic communication indicating the reservation for the dinner. The media guidance application may play back the retrieved portion of the conversation by providing the links to supplemental information of the entry to the user on a user device. For example, the media guidance application may provide in the playback the information about the reservation at the restaurant from the linked electronic communication in the entry.

In some embodiments, the media guidance application retrieves, from the database of indexed conversations, a set of entries from the database of indexed conversations. The corresponding record of users for each entry in the set of entries includes the user 106. In some embodiments, the portions of conversations may be conversations previously recorded by the media guidance application. In some embodiments, the portions of conversations may also be conversations recorded and uploaded by a user. For example, the media guidance application may search the entries for all the entries that list Joe (e.g., user 106) as a participant.

The media guidance application searches each set of keywords associated with each entry in the set of entries for a set of keywords that matches the set of words from the parsed query. For example, the media guidance application may search for entries that include keywords such as "plan" and "Friday" based on the words "what", "my", "plans", "Friday" from the query. The media guidance application identifies an entry with the matching set of keywords. For example, the media guidance application may identify an entry with the keywords "plan", "dinner", and "Friday".

The media guidance application processes the relevant portion of the conversation from the identified entry to determine context clues related to the query. For example, the media guidance application may process the conversation to find the portion stating "Let's plan to have dinner on Friday". The media guidance application generates a set of responses to the query based on the determined context clues related to the query. For example, the media guidance application may generate multiple responses with varying levels of detail about plans for dinner, some of which include restaurants and times, based on the conversation.

In some embodiments, the media guidance application processes the relevant portion of the conversation from the identified entry to determine context clues related to the query by retrieving the portion of the conversation from the entry, and retrieving the set of words. The media guidance application then determines a set of matched words based on the portion of the conversation and the set of matched words. The set of matched words includes the words that are included in both the set of words from the query as well as found in the portion of the conversation. For example, a set of matched words could be "plan" and "Friday". The media guidance application then generates a set of templates from the set of matched words, with each template in the set of templates requiring words of specific categories. The media guidance application may access a database of templates to generate a set of templates based on the matched words. Each template may be a generic response with blank spots tagged with specific categories of words to be filled in. For example, the word "plan" may generate the templates of "Yes, there is a plan on (day of week)" and "No, there is not a plan on (day of week)". The media guidance application may use the set of matched words together. For example, the words "plan" and "Friday" may also generate the template responses of "Yes, there are plans for (noun/activity) on Friday" and "No, there are no plans for (noun/activity) on Friday". Each template response may be tagged with a default privacy level. The media guidance application then searches the portion of the conversation for words with a category that match a required specific category for a template from the set of templates For example, the media guidance application searches the portion of the conversation for a noun that is related to an activity and finds the word "dinner".

The media guidance application may generate the response to the query based on the determined context clues related to the query by generating a set of responses to the query based on the set of templates and the searched words with a category that matches the required specific category, and filtering the set of responses to the query based on the portion of the conversation and the set of words. For example, the media guidance application may generate a response "Yes, there are plans for dinner on Friday", "No, there are no plans for dinner on Friday", and "You plan to have dinner on Friday". The portion of the conversation "Let's have dinner on Friday" does not include a word in the negative category and so the response "No, there are no plans for dinner on Friday" is not appropriate. In another example, the set of words includes a question word "What" which is not associated with a yes/no answer and so "Yes, there are plans for dinner on Friday" is not appropriate. The media guidance application may identify specific segments of a response for possible filtering. For example, if the full response is "You plan to have dinner on Friday and then go home to have sex", the phrases "and then go home to have sex" or "to have sex" may be identified as segments of the response containing a known keyword that may be removed under a high privacy setting.

The media guidance application compares the other users (e.g., users 108 and 110) within the area 102 around the user 106 to a set of rules 106. The media guidance application determines a level of privacy based on the comparing. The media guidance application may determine the level of privacy based on whether any of the other users (e.g., users 108 and 110) within the area 102 are below an age threshold. For example, if children are in the area a high level of privacy may be required in order to prevent inappropriate language and discussion of adult topics. The media guidance application may determine the level of privacy based on whether keywords that correspond to the selected entry in the set of entries meet the set of rules 106. For example, if there are sex-related keywords, a high level of privacy may be required. The media guidance application may determine the level of privacy based on whether identities of each of the other users (e.g., users 108 and 110) meet the set of rules 106. For example, if Joe is planning a surprise birthday party for Bob, he may set a rule that nothing related to the party may be discussed in front of Bob. The media guidance application may determine the level of privacy based on whether the set of words meet the set of rules 106. For example, the query may include words relating to sex and so a high level of privacy may be required.

The media guidance application filters out segments of the response based the determined level of privacy. For example, the media guidance application may determine a high level of privacy is required due to the presence of users under a threshold age, and may then proceed to remove the segment "and then go home to have sex" from a response which would have otherwise been "You plan to have dinner on Friday and then go home to have sex" . . . . The media guidance application provides to the user the response to the query. For example, the media guidance application may play back the appropriate response on a user device.

In some embodiments, the media guidance application may select part of the retrieved portion for playback based on the determined level of privacy. For example, the media guidance application may identify a portion of the playback such as "Let's plan to have dinner on Friday night." In some embodiments, each entry of the database of indexed conversations comprises links to supplemental information based on a set of keywords associated with a corresponding entry from the database. For example, an entry discussing plans for dinner at a restaurant may include links to the restaurant or a link to the electronic communication indicating the reservation for the dinner. The media guidance application may play back the retrieved portion of the conversation by providing the links to supplemental information of the entry to the user on a user device. For example, the media guidance application may provide in the playback the information about the reservation at the restaurant from the linked electronic communication in the entry.

FIG. 2 shows an illustrative embodiment of a database of indexed conversations, in accordance with some embodiments of the disclosure. Database 202 shows entries 204, 206 and 208. Entry 204 includes a portion of a conversation as well as keywords 210 and the record of participants 212.

The media guidance application searches the database of indexed conversations (e.g., database 202) for a set of entries (e.g., entries 204 and 206) associated with a corresponding record of users for each entry that includes the user (e.g., user 106). For example, the media guidance application may search the entries for all the entries that list Joe (e.g., user 106) as a participant.

The media guidance application filters the set of entries (e.g., entries 204 and 206) so that each entry in the set of entries has a corresponding record of users (e.g., record of participants 212) that includes the other users within the area 102 around the user 106 in the corresponding record of users. For example, the media guidance application may filter the entries to find the entries that also have Bob (e.g., user 108) as a participant.

The media guidance application compares, for each entry in the set of entries (e.g., entries 204 and 206), the corresponding set of keywords (e.g., keywords 210) to the set of words from the parsed query. For example, the media guidance application may compare the keywords of plan, dinner, and Friday, to the parsed query with words "what", "my", "plans", "Friday". The media guidance application determines, based on the comparison, for each entry, an amount of the corresponding keywords that match the set of words. For example, the media guidance application determines that plans and Friday from the query match plan and Friday from the entry (e.g., entry 204).

The media guidance application determines an entry in the set of entries (e.g., entries 204 and 206) with a best match based on the amount. For example, the media guidance application determines that this entry with matching keywords of plan and Friday is the best match entry. The media guidance application selects the determined entry of the database of indexed conversations. The media guidance application retrieves the portion of the conversation associated with the selected entry (e.g., entry 204). For example, the media guidance application retrieves the conversation portion of "Let's plan to have dinner on Friday night. Yes, that works." The media guidance application plays back the retrieved portion of the conversation. For example, the media guidance application may play back that portion to Joe on Joe's user device.

In some embodiments, the media guidance application generates a response to the query based on the retrieved portion of the conversation and the corresponding keywords (e.g., keywords 210). For example, the media guidance application generates a response of "You have plans to have dinner on Friday". The media guidance application may generate a set of responses to the query based on the identified entry and the matching set of keywords associated, and determines an appropriate response to the query from the set of responses that matches the determined level of privacy. For example, the media guidance application may generate multiple responses with varying levels of detail about plans for dinner, some of which include restaurants and times, and then determine that there are users in the room which did not participate in the original conversation and so not all of the details are appropriate for playback.

The media guidance application retrieves, from the database of indexed conversations (e.g., database 202), a set of entries (e.g., entries 204 and 206) from the database of indexed conversations. The corresponding record of users (e.g., record of participants 212) for each entry in the set of entries includes the user 106. For example, the media guidance application may search the entries for all the entries that list Joe (e.g., user 104) as a participant.

The media guidance application searches each set of keywords (e.g., keywords 210) associated with each entry in the set of entries (e.g., entries 204 and 206) for a set of keywords that matches the set of words from the parsed query. For example, the media guidance application may search for entries that include keywords such as "plan" and "Friday" based on the words "what", "my", "plans", "Friday" from the query. The media guidance application identifies an entry with the matching set of keywords. For example, the media guidance application may identify an entry with the keywords "plan", "dinner", and "Friday".

The media guidance application processes the relevant portion of the conversation from the identified entry (e.g., entry 204) to determine context clues related to the query. For example, the media guidance application may process the conversation to find the portion stating "Let's plan to have dinner on Friday". The media guidance application generates a set of responses to the query based on the determined context clues related to the query. For example, the media guidance application may generate multiple responses with varying levels of detail about plans for dinner, some of which include restaurants and times, based on the conversation.

In some embodiments, the media guidance application processes the relevant portion of the conversation from the identified entry (e.g., entry 204) to determine context clues related to the query by retrieving the portion of the conversation from the entry (e.g., entry 204), and retrieving the set of words. The media guidance application then determines a set of matched words based on the portion of the conversation and the set of matched words. The set of matched words includes the words that are included in both the set of words from the query as well as found in the portion of the conversation. For example, a set of matched words could be "plan" and "Friday". The media guidance application then generates a set of templates from the set of matched words, with each template in the set of templates requiring words of specific categories. The media guidance application may access a database of templates to generate a set of templates based on the matched words. Each template may be a generic response with blank spots tagged with specific categories of words to be filled in. For example, the word "plan" may generate the templates of "Yes, there is a plan on (day of week)" and "No, there is not a plan on (day of week)". The media guidance application may use the set of matched words together. For example, the words "plan" and "Friday" may also generate the template responses of "Yes, there are plans for (noun/activity) on Friday" and "No, there are no plans for (noun/activity) on Friday". Each template response may be tagged with a default privacy level. The media guidance application then searches the portion of the conversation for words with a category that match a required specific category for a template from the set of templates For example, the media guidance application searches the portion of the conversation for a noun that is related to an activity and finds the word "dinner".

The media guidance application may generate the response to the query based on the determined context clues related to the query by generating a set of responses to the query based on the set of templates and the searched words with a category that matches the required specific category, and filtering the set of responses to the query based on the portion of the conversation and the set of words. For example, the media guidance application may generate a response "Yes, there are plans for dinner on Friday", "No, there are no plans for dinner on Friday", and "You plan to have dinner on Friday". The portion of the conversation "Let's have dinner on Friday" does not include a word in the negative category and so the response "No, there are no plans for dinner on Friday" is not appropriate. In another example, the set of words includes a question word "What" which is not associated with a yes/no answer and so "Yes, there are plans for dinner on Friday" is not appropriate. The media guidance application may identify specific segments of a response for possible filtering. For example, if the full response is "You plan to have dinner on Friday and then go home to have sex", the phrases "and then go home to have sex" or "to have sex" may be identified as segments of the response containing a known keyword that may be removed under a high privacy setting.

Figures 3, 4:
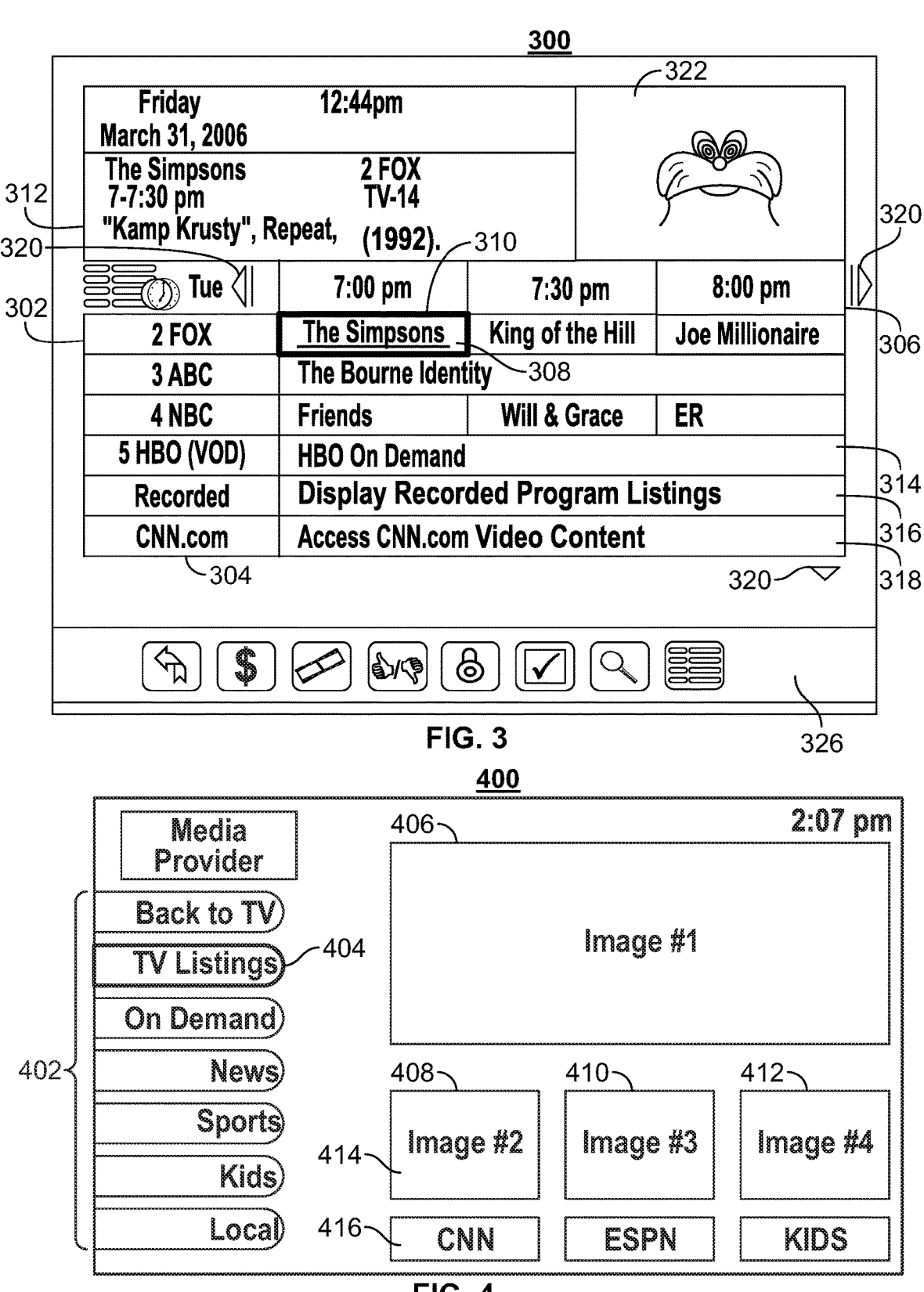
FIG. 3 shows an illustrative embodiment of a display screen that may be used to provide media guidance application listings and other media guidance information, in accordance with some embodiments of the disclosure.
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/ or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
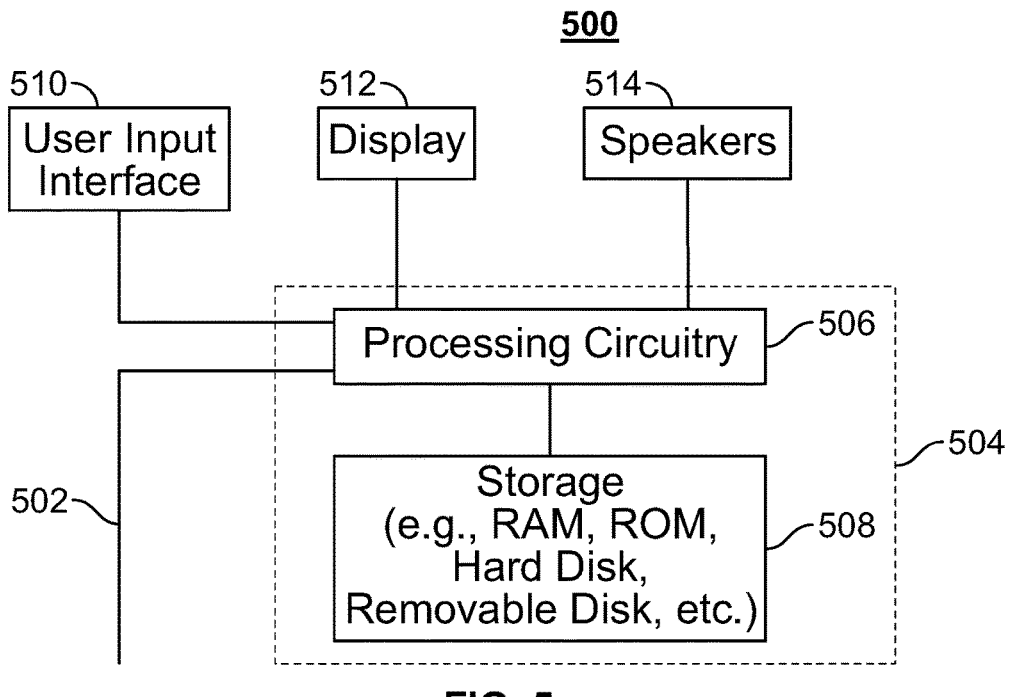
FIG. 5 is a block diagram of an illustrative user equipment (UE) device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
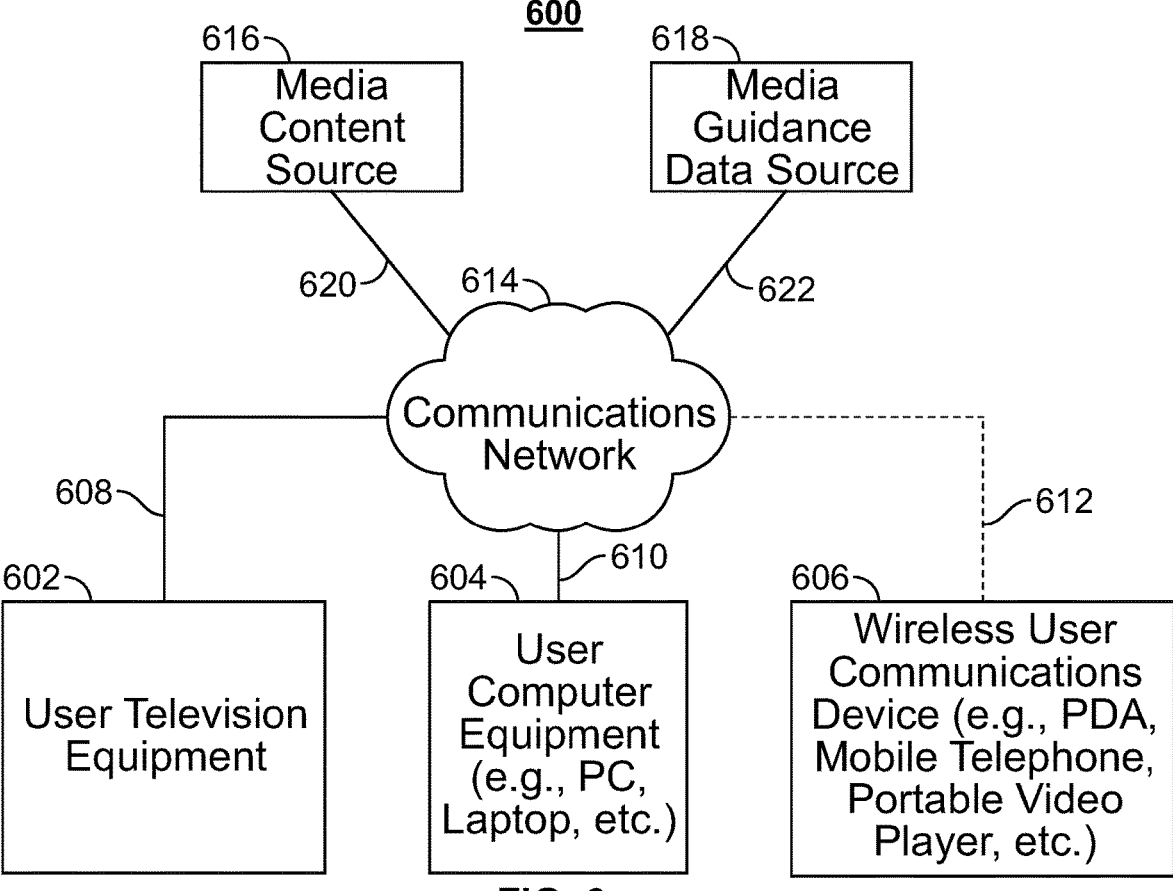
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 7 is a flowchart of illustrative steps involved in playing back indexed conversations based on the presence of other people, in accordance with some embodiments of the disclosure.

At 702, control circuitry 504 receives from the user a query. For example, control circuitry 504 may receive from user 104 a query about if there are plans for Friday. Process 700 proceeds to 704.

At 704, control circuitry 504 detects other users within the area around the user. For example, control circuitry 504 may detect that Bob is within a certain specified threshold distance of Joe. Control circuitry 504 may determine the locations of each user based on a user device associated with the user. Control circuitry 504 may determine the locations of each user based on monitoring of the area via camera, microphone, or other recording equipment. Process 700 proceeds to 706.

At 706, control circuitry 504 parses the query into a set of words. For example, Joe's query may be "What are my plans for Friday?" may be parsed into a set of words including "what", "my", "plans", "Friday". Process 700 proceeds to 708.

At 708, control circuitry 504 retrieves, from the database of indexed conversations, a set of entries from the database of indexed conversations, where each entry in the database of indexed conversations includes a portion of a conversation, a record of users participating in the conversation, and a set of keywords associated with the conversation and where the corresponding record of users for each entry in the set of entries includes the user and the other users within the area. For example, the database 202 may have an entry with a portion of conversation that includes the words "Let's plan to have dinner on Friday night. Yes, that works," a list of keywords such as plan, dinner, Friday, and a list of participants such as Bill, Bob, and Joe. Process 700 proceeds to 710.

At 710, control circuitry 504 determines an entry in the set of entries with a best match based on the amount of the correspond set of keywords that match the set of words. For example, control circuitry 504 determines that this entry with matching keywords of plan and Friday is the best match entry. Process 700 proceeds to 712.

At 712, control circuitry 504 selects the determined entry of the database of indexed conversations. Process 700 proceeds to 714.

At 714, control circuitry 504 retrieves the portion of the conversation associated with the selected entry. For example, control circuitry 504 retrieves the conversation portion of "Let's plan to have dinner on Friday night. Yes, that works." Process 700 proceeds to 716.

At 716, control circuitry plays back the retrieved portion of the conversation. For example, control circuitry 504 may play back that portion to Joe on Joe's user device. Control circuitry 504 may provide the retrieved portion of the conversation to a user device for playback.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 7.

FIG. 8 is another flowchart of an illustrative process 800 for playing back indexed conversations based on the presence of other people, in accordance with some embodiments of the disclosure.

At 802, control circuitry 504 receives from the user a query. For example, control circuitry 504 may receive from user 104 a query about if there are plans for Friday. Control circuitry 504 may receive a query from a user via microphone, video camera, or any other recording or monitoring equipment. Control circuitry 504 may receive the query via input from a user device. Process 800 proceeds to 804.

At 804, control circuitry 504 monitors an area around the user. For example, the media guidance application may record or maintain a list of the users that enter and exit an area via camera or by tracking the user's personal devices to find that users Bob and Joe are in the area. Process 800 proceeds to 806.

At 806, control circuitry 504 detects other users within the area around the user. For example, control circuitry 504 may detect that Bob is within a certain specified distance of Joe. Control circuitry 504 may determine the locations of each user based on a user device associated with the user. Control circuitry 504 may determine the locations of each user based on monitoring of the area via camera, microphone, or other recording equipment. Control circuitry 504 may determine that users are in the same location based on determining that users are within a threshold distance of one another. Process 800 proceeds to 808.

At 808, control circuitry 504 parses the query into a set of words. For example, Joe's query may be "What are my plans for Friday?" may be parsed into a set of words including "what", "my", "plans", "Friday". Process 800 proceeds to 810.

At 810, control circuitry 504 accesses a database of indexed conversations, where each entry in the database of indexed conversations includes a portion of a conversation, a record of users participating in the conversation, and a set of keywords associated with the conversation. For example, the database 202 may have an entry with a portion of conversation that includes the words "Let's plan to have dinner on Friday night. Yes, that works," a list of keywords such as plan, dinner, Friday, and a list of participants such as Bill, Bob, and Joe. Process 800 proceeds to 812.

At 812, control circuitry 504 searches the database of indexed conversations for a set of entries associated with a corresponding record of users for each entry that includes the user. For example, the control circuitry 504 may search the entries for all the entries that list Joe as a participant. Process 800 proceeds to 814.

At 814, control circuitry 504 filters the set of entries so that each entry in the set of entries has a corresponding record of users that includes the other users within the area around the user in the corresponding record of users. For example, control circuitry 504 may filter the entries to find the entries that also have Bob as a participant. Process 800 proceeds to 816.

At 816, control circuitry 504 compares, for each entry in the set of entries, the corresponding set of keywords to the set of words from the parsed query. For example, control circuitry 504 may compare the keywords of plan, dinner, and Friday, to the parsed query with words "what", "my", "plans", "Friday". Process 800 proceeds to 818.

At 818, control circuitry 504 determines, based on the comparison, for each entry, an amount of the corresponding keywords that match the set of words. For example, control circuitry 504 determines that plans and Friday from the query match plan and Friday from the entry. Process 800 proceeds to 820.

At 820, control circuitry 504 determines an entry in the set of entries with a best match based on the amount. For example, control circuitry 504 determines that this entry with matching keywords of plan and Friday is the best match entry. Process 800 proceeds to 822.

At 822, control circuitry 504 selects the determined entry of the database of indexed conversations. Process 800 proceeds to 824.

At 824, control circuitry 504 retrieves the portion of the conversation associated with the selected entry. For example, control circuitry 504 retrieves the conversation portion of "Let's plan to have dinner on Friday night. Yes, that works." Process 800 proceeds to 826.

At 826, control circuitry 504 plays back the retrieved portion of the conversation. Control circuitry 504 may provide the retrieved portion of the conversation to a user device for playback. For example, control circuitry 504 may play back that portion to Joe on Joe's user device.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 8.

FIG. 9 is flowchart an illustrative process 900 for replying to queries based on indexed conversations and context, in accordance with some embodiments of the disclosure.

At 902, control circuitry 504 receives from the user a query. For example, control circuitry 504 may receive from user 104 a query about if there are plans for Friday. Process 900 proceeds to 904.

At 904, control circuitry 504 detects other users within the area around the user. For example, control circuitry 504 may detect that Bob is within a certain specified distance of Joe. Process 900 proceeds to 906.

At 906, control circuitry 504 parses the query into a set of words. For example, Joe's query may be "What are my plans for Friday?" may be parsed into a set of words including "what", "my", "plans", "Friday". Process 900 proceeds to 908.

At 908, control circuitry 504 retrieves, from the database of indexed conversations, a set of entries from the database of indexed conversations, where each entry in the database of indexed conversations includes a portion of a conversation, a record of users participating in the conversation, and a set of keywords associated with the conversation and where the corresponding record of users for each entry in the set of entries includes the user and the other users within the area. For example, the database 202 may have an entry with a portion of conversation that includes the words "Let's plan to have dinner on Friday night. Yes, that works," a list of keywords such as plan, dinner, Friday, and a list of participants such as Bill, Bob, and Joe. Process 900 proceeds to 910.

At 910, control circuitry 504 identifies an entry with a set of keywords that matches the set of words from the parsed query. For example, control circuitry 504 may identify an entry with the keywords "plan", "dinner", and "Friday". Process 900 proceeds to 912.

At 912, control circuitry 504 generates a response to the query based on the determined context clues related to the query. For example, control circuitry 504 may generate multiple responses with varying levels of detail about plans for dinner, some of which include restaurants and times, based on the conversation, and proceed to filter the responses based on the specific words of the query. Process 900 proceeds to 914.

At 914, control circuitry 504 filters out segments of the response based the other users within the area around the user and a set of rules. For example, control circuitry 504 may remove a segment of a response "to have sex" from a response which would otherwise have been "You plan to have dinner on Friday and go home to have sex", based on detecting the presence of users under a threshold age. Process 900 proceeds to 916.

At 916, control circuitry provides to the user the response to the query. For example, control circuitry 504 may play back the appropriate response on a user device.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 9.

FIG. 10 is another flowchart an illustrative process 1000 for replying to queries based on indexed conversations and context, in accordance with some embodiments of the disclosure.

At 1002, control circuitry 504 receives from the user a query. For example, control circuitry 504 may receive from user 104 a query about if there are plans for Friday. Process 1000 proceeds to 1004.

At 1004, control circuitry 504 monitors an area around the user. For example, the media guidance application may record the users that enter and exit an area via a camera or by tracking the user's personal devices to find that users Bob and Joe are in the area. Process 1000 proceeds to 1006.

At 1006, control circuitry 504 detects other users within the area around the user. For example, control circuitry 504 may detect that Bob is within a certain specified distance of Joe. Process 1000 proceeds to 1008.

At 1008, control circuitry 504 parses the query into a set of words. For example, Joe's query may be "What are my plans for Friday?" may be parsed into a set of words including "what", "my", "plans", "Friday". Process 1000 proceeds to 1010.

At 1010, control circuitry 504 accesses a database of indexed conversations, where each entry in the database of indexed conversations includes a portion of a conversation, a record of users participating in the conversation, and a set of keywords associated with the conversation. Process 1000 proceeds to 1012.

At 1012, control circuitry 504 retrieves, from the database of indexed conversations, a set of entries from the database of indexed conversations, where the corresponding record of users for each entry in the set of entries includes the user 104. For example, the database 202 may have an entry with a portion of conversation that includes the words "Let's plan to have dinner on Friday night. Yes, that works," a list of keywords such as plan, dinner, Friday, and a list of participants such as Bill, Bob, and Joe. Process 1000 proceeds to 1014.

At 1014, control circuitry 504 searches each set of keywords associated with each entry in the set of entries for a set of keywords that matches the set of words from the parsed query. For example, control circuitry 504 may search for entries that include keywords such as "plan" and "Friday" based on the words "what", "my", "plans", "Friday" from the query. Process 1000 proceeds to 1016.

At 1016, control circuitry 504 identifies an entry with the matching set of keywords from the parsed query. For example, control circuitry 504 may identify an entry with the keywords "plan", "dinner", and "Friday". Process 1000 proceeds to 1018.

At 1018, control circuitry 504 processes the relevant portion of the conversation from the identified entry to determine context clues related to the query. For example, control circuitry 504 may process the conversation to find the portion stating "Let's plan to have dinner on Friday". Process 1000 proceeds to 1020.

At 1020, control circuitry 504 generates a response to the query based on the determined context clues related to the query. For example, the control circuitry 504 may generate multiple responses with varying levels of detail about plans for dinner, some of which include restaurants and times, based on the conversation, and proceed to filter the responses based on the specific words of the query. Process 1000 proceeds to 1022.

At 1022, control circuitry 504 compares the other users within the area around the user to a set of rules. Process 1000 proceeds to 1024.

At 1024, control circuitry 504 determines a level of privacy based on the comparing. Control circuitry 504 may determine the level of privacy based on whether identities of each of the other users meet the set of rules. Process 1000 proceeds to 1026.

At 1026, control circuitry 504 filters out segments of the response based on the level of privacy. For example, control circuitry 504 may remove a segment of a response "to have sex" from a response which would otherwise have been "You plan to have dinner on Friday and go home to have sex", based on detecting the presence of users under a threshold age. Process 1000 proceeds to 1028.

At 1028, control circuitry 504 provides to the user the response to the query. For example, control circuitry 504 may play back the appropriate response on a user device.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 10.

Figure 11:
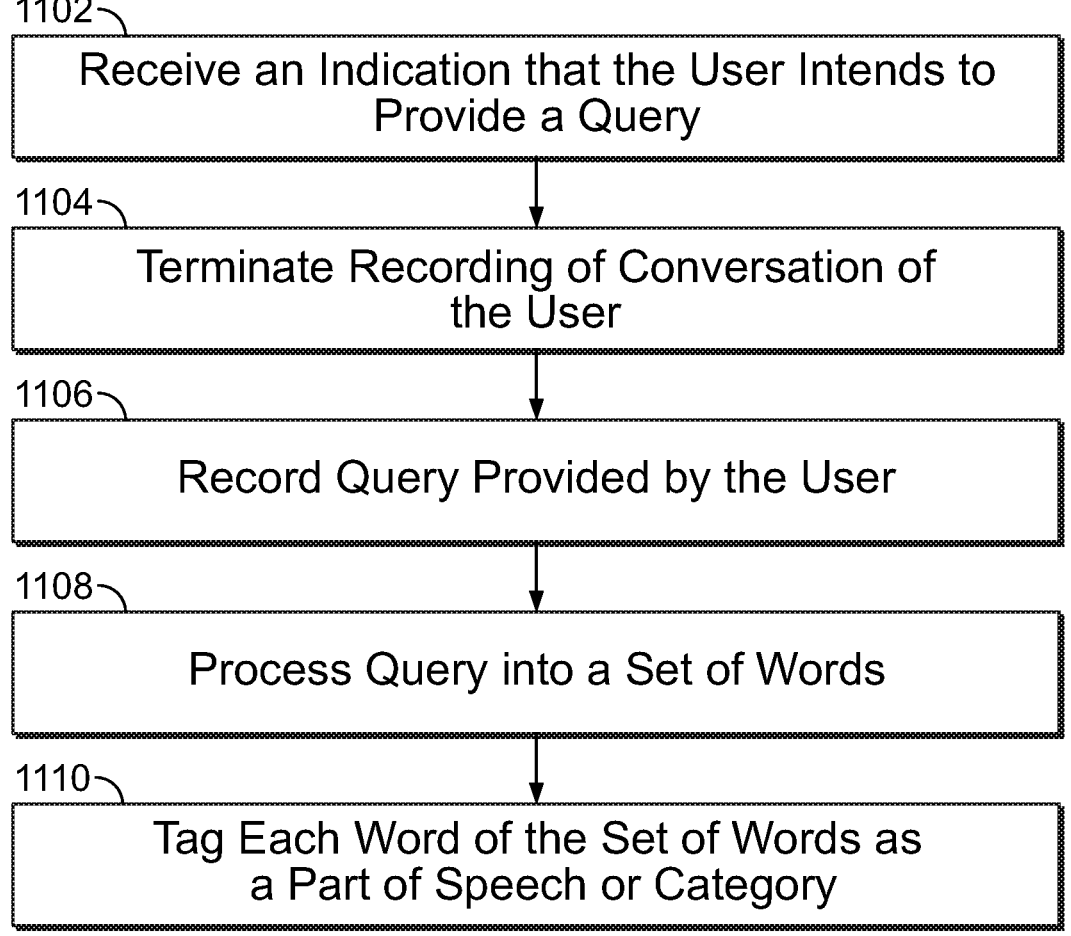
FIG. 11 is a flowchart of illustrative steps involved in processing a query received from the user, in accordance with some embodiments of the disclosure.

FIG. 11 is a flowchart an illustrative process 1100 for processing a query received from the user, in accordance with some embodiments of the disclosure.

At 1102, control circuitry 504 receives an indication that the user intends to provide a query. For example, control circuitry 504 may receive a signal word or phrase such as "Hello World" to indicate that the user intends to provide a query. Process 1100 proceeds to 1104.

At 1104, control circuitry 504 terminates recording of a conversation of the user. For example, control circuitry 504 may record all conversations in the area when users are present and upon hearing the signal word or phrase, terminate the recording. Process 1100 proceeds to 1106.

At 1106, control circuitry 504 records the query provided by the user. For example, control circuitry 504 may receive user input via a microphone or other audio input equipment. Process 1100 proceeds to 1108.

At 1108, control circuitry 504 processes query into a set of words. For example, Joe's query may be "What are my plans for Friday?" may be parsed into a set of words including "what", "my", "plans", "Friday". Process 1100 proceeds to 1110.

At 1110, control circuitry 504 tags each word of the set of words as a part of speech or category. For example, "what" is a question word requiring a noun answer and "Friday" is a day of the week.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 11.

Figure 12:
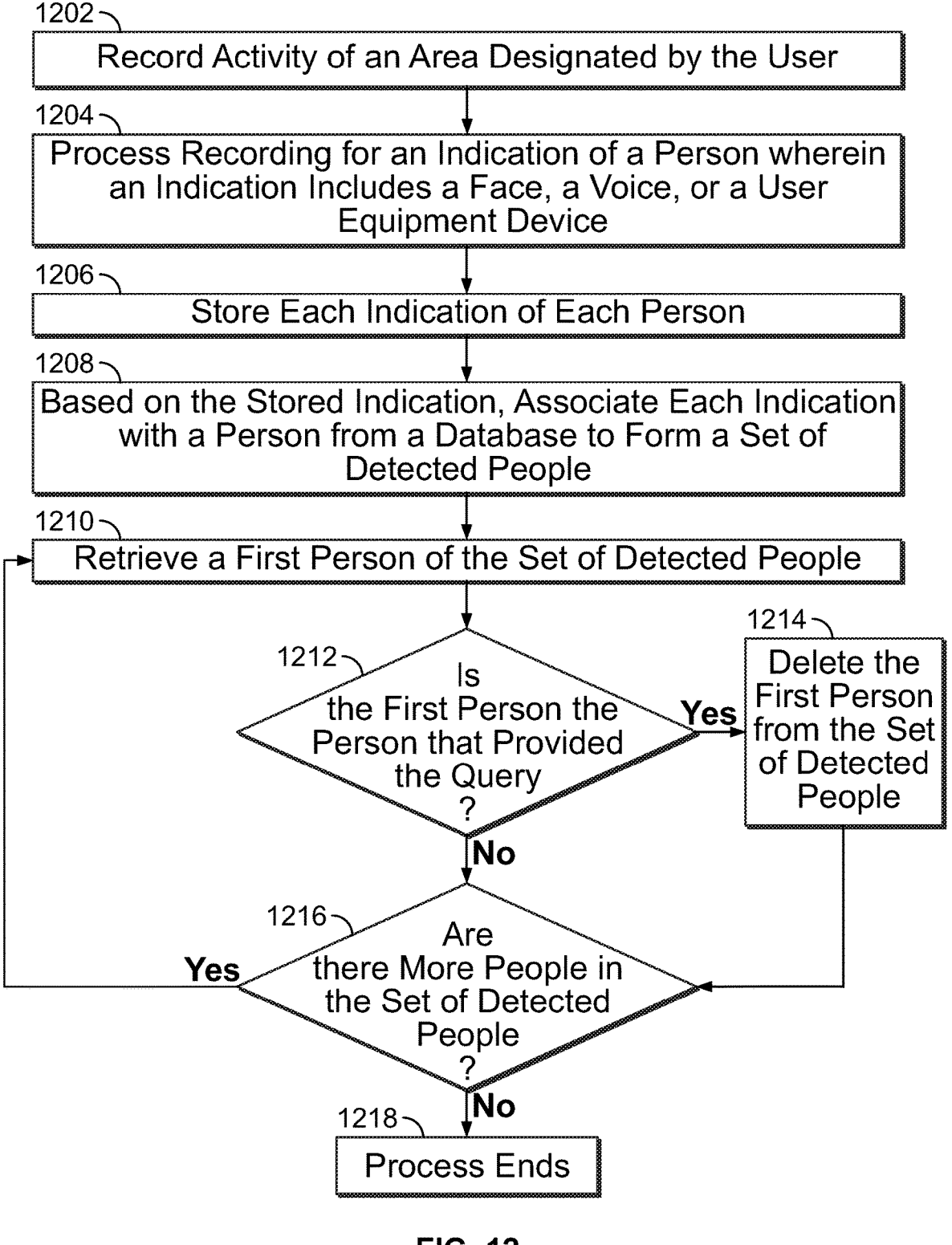
FIG. 12 is a flowchart of illustrative steps involved in detecting other users in monitored area around the user, in accordance with some embodiments of the disclosure.

FIG. 12 is a flowchart an illustrative process 1200 for detecting other users in monitored area around the user, in accordance with some embodiments of the disclosure.

At 1202, control circuitry 504 records activity of an area designated by the user. For example, control circuitry 504 may monitor a specified room of a building or a specified distance around a user device. Process 1200 proceeds to 1204.

At 1204, control circuitry 504 processes recording for an indication of a person where an indication includes a face, a voice, or a user equipment device. For example, control circuitry 504 may run a facial recognition program to determine the identity of a user by the face. In another example, control circuitry 504 may run a voice identification program to determine the identity via voice. In another example, control circuitry 504 may retrieve the id of the user equipment device and retrieve the identity of the user associated with the user equipment device. Process 1200 proceeds to 1206.

At 1206, control circuitry 504 stores each indication of each person. For example, control circuitry 504 may store the indications in local memory or on a server. Process 1200 proceeds to 1208.

At 1208, control circuitry 504 may associate, based on the stored indications, each indication with a person from a database to form a set of detected people. For example, control circuitry 504 may determine whether a person is detected twice based on multiple indications and include the person only once in the set of detected people but tag that person with multiple indications. Process 1200 proceeds to 1210.

At 1210, control circuitry 504 retrieves a first person of the set of detected people. Process 1200 proceeds to 1212.

At 1212, control circuitry 504 determines whether the first person is the person that provided the query. If the first person provided the query, process 1200 proceeds to 1214. If not, process 1200 proceeds to 1216.

At 1214, control circuitry 504 deletes the first person from the set of detected people. Process 1200 proceeds to 1216.

At 1216, control circuitry 504 determines whether there are more people in the set of detected people. If control circuitry 504 determines that there are more people in the set of detected people, process 1200 proceeds to 1210. If not, process 1200 proceeds to 1218. At 1218, the process ends.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 12.

FIG. 13 is a flowchart an illustrative process 1300 for searching database of indexed conversations for a set of entries, in accordance with some embodiments of the disclosure.

At 1302, control circuitry 504 accesses the database of indexed conversations. Process 1300 proceeds to 1304.

At 1304, control circuitry 504 retrieves a first entry of the database. Process 1300 proceeds to 1306.

At 1306, control circuitry 504 determines whether the first entry has a record of participating users that includes the user. If control circuitry 504 determines that the first entry has a record of participating users that includes the user, process 1300 proceeds to 1308. If not, process 1300 proceeds to 1316.

At 1308, control circuitry 504 retrieves a first person from the detect set of other users. Process 1300 proceeds to 1310.

At 1310, control circuitry 504 determines whether the first entry has a record of participating users that includes the first person. If control circuitry 504 determines that the first entry has a record of participating users that includes the first person, process 1300 proceeds to 1312. If no, process 1300 proceeds to 1316.

At 1312, stores the entry in the set of entries. Process 1300 proceeds to 1314.

At 1314, control circuitry 504 determines whether another person is in the detected set of other users. If control circuitry 504 determines that another person is in the detected set of other users, process 1300 proceeds to 1308. If not, process 1300 proceeds to 1318.

At 1316, control circuitry 504 determines whether there is another entry in the database. If control circuitry 504 determines that there is another entry in the database, process 1300 proceeds to 1304. If not, process 1300 proceeds to 1318. At 1318, process 1300 ends.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 13.

Figure 14:
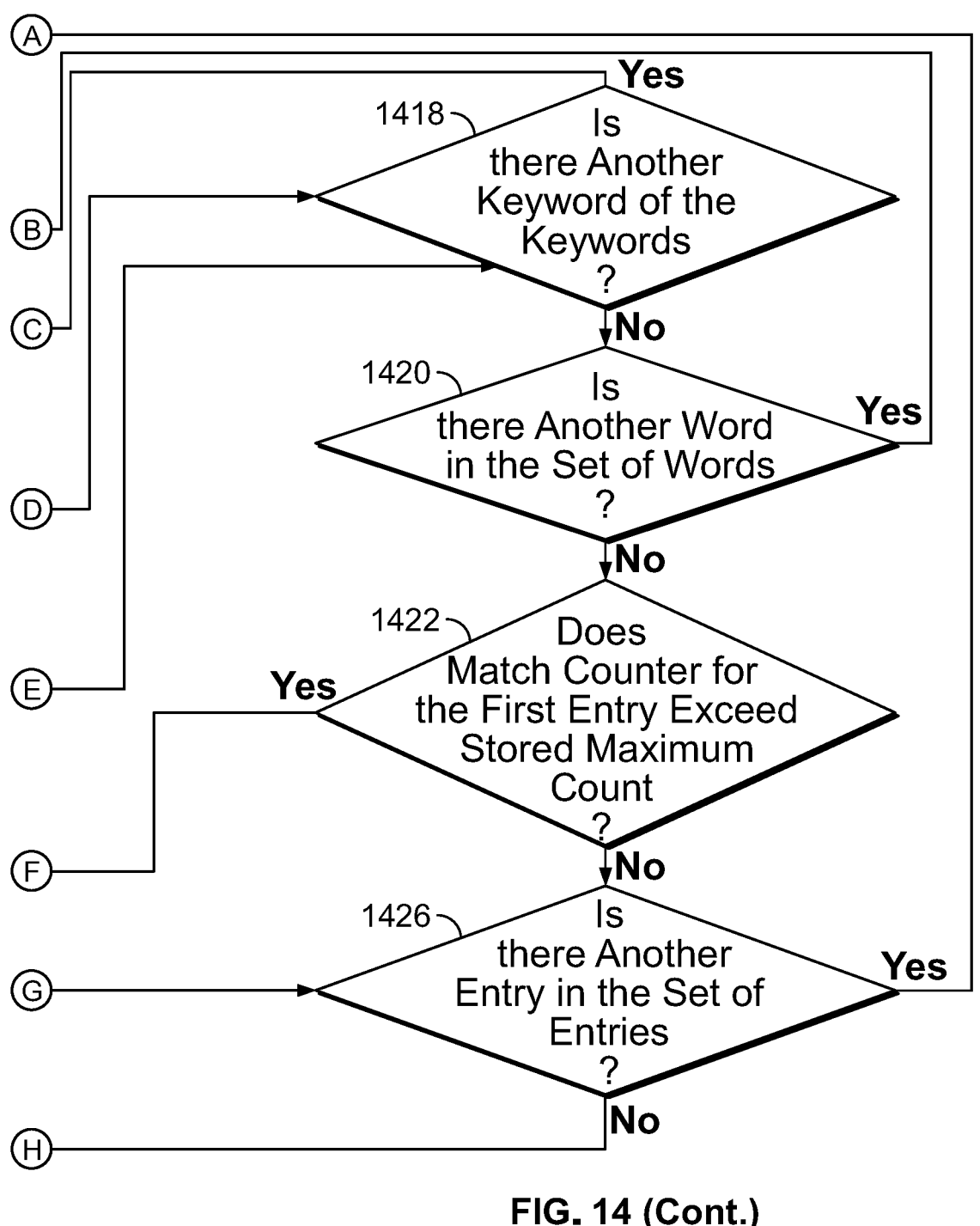
FIG. 14 is a flowchart of illustrative steps involved in determining the entry of the set of entries that matches the query, in accordance with some embodiments of the disclosure.

FIG. 14 is a flowchart an illustrative process 1400 for determining the entry of the set of entries that matches the query, in accordance with some embodiments of the disclosure.

At 1402, control circuitry 504 retrieves the set of entries. For example, control circuitry 504 may retrieve a set of entries include entry 204. Process 1400 proceeds to 1404.

At 1404, control circuitry 504 retrieves the set of words associated with the query. For example, control circuitry 504 may retrieve the words "Friday" and "plan" from the query. Process 1400 proceeds to 1406.

At 1406, control circuitry 504 retrieves the first entry of the set of entries. For example, control circuitry 504 may retrieve entry 204 from the set of entries. Process 1400 proceeds to 1408.

At 1408, control circuitry 504 retrieves the keywords from the first entry. For example, control circuitry 504 may retrieve keywords 210 from entry 204. Process 1400 proceeds to 1410.

At 1410, control circuitry 504 retrieves the first word from the set of words. For example, control circuitry 504 may retrieve "plan" from the set of words. Process 1400 proceeds to 1412.

At 1412, control circuitry 504 retrieves the first keyword of the keywords. For example, control circuitry 504 may retrieve "plan" from keywords 210. Process 1400 proceeds to 1414.

At 1414, control circuitry 504 determines whether the first word matches the first keyword. If control circuitry 504 determines that the first word matches the first keyword, process 1400 proceeds to 1416. If not, process 1400 proceeds to 1418.

At 1416, control circuitry 504 increases the match counter for the first entry. For example, if the word "plan" matched the keyword "plan" from keywords 210, the counter for the number of found matches increases by one. Process 1400 proceeds to 1418.

At 1418, control circuitry 504 determines whether there is another keyword in the keywords. If control circuitry 504 determines that there is another keyword in the keywords, process 1400 proceeds to 1412. If not, process 1400 proceeds to 1420.

At 1420, control circuitry 504 determines whether there is another word in the set of words. If control circuitry 504 determines that there is another word in the set of words, process 1400 proceeds to 1410. If not, process 1400 proceeds to 1422.

At 1422, control circuitry 504 determines whether the match counter for the first entry exceeds the stored maximum count. For example, if there is a previous entry had a total of 1 match and entry 204 has a match counter of 2 matches, the match counter exceeds the stored maximum count. If control circuitry 504 determines that the match counter for the first entry exceeds the stored maximum count, process 1400 proceeds to 1424. If not, process 1400 proceeds to 1426.

At 1424, control circuitry 504 stores the match counter for the first entry as the maximum count. Process 1400 proceeds to 1426.

At 1426, control circuitry 504 determines whether there is another entry in the set of entries. If control circuitry 504 determines that there is another entry in the set of entries, process 1400 proceeds to 1406. If not, process 1400 proceeds to 1428.

At 1428, control circuitry 504 retrieves the entry associated with the maximum count.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 14.

FIG. 15 is a flowchart an illustrative process 1500 for generating a set of response to the query, in accordance with some embodiments of the disclosure.

At 1502, control circuitry 504 retrieves an identified entry from the database. For example, control circuitry 504 may retrieve entry 204. Process 1500 proceeds to 1504.

At 1505, control circuitry 504 retrieves the portion of the conversation stored in the entry. For example, control circuitry 504 may retrieve the portion "Let's plan to have dinner on Friday" from entry 204. Process 1500 proceeds to 1506.

At 1506, control circuitry 504 retrieves the set of words associated with the query. For example, control circuitry 504 may retrieve the words "what", "plan", and "Friday". Process 1500 proceeds to 1508.

At 1508, control circuitry 504 determines a set of matched words. The set of matched words includes the words that are included in both the set of words from the query as well as found in the portion of the conversation. For example, a set of matched words could be "plan" and "Friday". Control circuitry 504 may find the set of matched words during the process 1400 or may separately search the portion of the conversation for words found in the set of words. Process 1500 proceeds to 1510.

At 1510, control circuitry 504 generates a set of templates from the matched words. Control circuitry 504 may access a database of templates to generate a set of templates based on the matched words. Each template may be a generic response with blank spots tagged with specific categories of words to be filled in. For example, the word "plan" may generate the templates of "Yes, there is a plan on (day of week)" and "No, there is not a plan on (day of week)". Control circuitry 504 may use the set of matched words together. For example, the words "plan" and "Friday" may also generate the template responses of "Yes, there are plans for (noun/activity) on Friday" and "No, there are no plans for (noun/activity) on Friday". Each template response may be tagged with a default privacy level. Process 1500 proceeds to 1512.

At 1512, control circuitry 504 searches the portion for words with categories that match a template from the set of templates. For example, control circuitry 504 searches the portion of the conversation for a noun that is related to an activity and finds the word "dinner". Process 1500 proceeds to 1514.

At 1514, control circuitry 504 generates a set of responses to the query based on the word or phrase and the set of templates. For example, control circuitry 504 may generate a response "Yes, there are plans for dinner on Friday", "No, there are no plans for dinner on Friday", and "You plan to have dinner on Friday". Process 1500 proceeds to 1516.

At 1516, control circuitry 504 filters the set of responses to the query based on the portion of the conversation and set of words. For example, the portion of the conversation "Let's have dinner on Friday" does not include a word in the negative category and so the response "No, there are no plans for dinner on Friday" is not appropriate. In another example, the set of words includes a question word "What" which is not associated with a yes/no answer and so "Yes, there are plans for dinner on Friday" is not appropriate.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 15.

Figure 16:
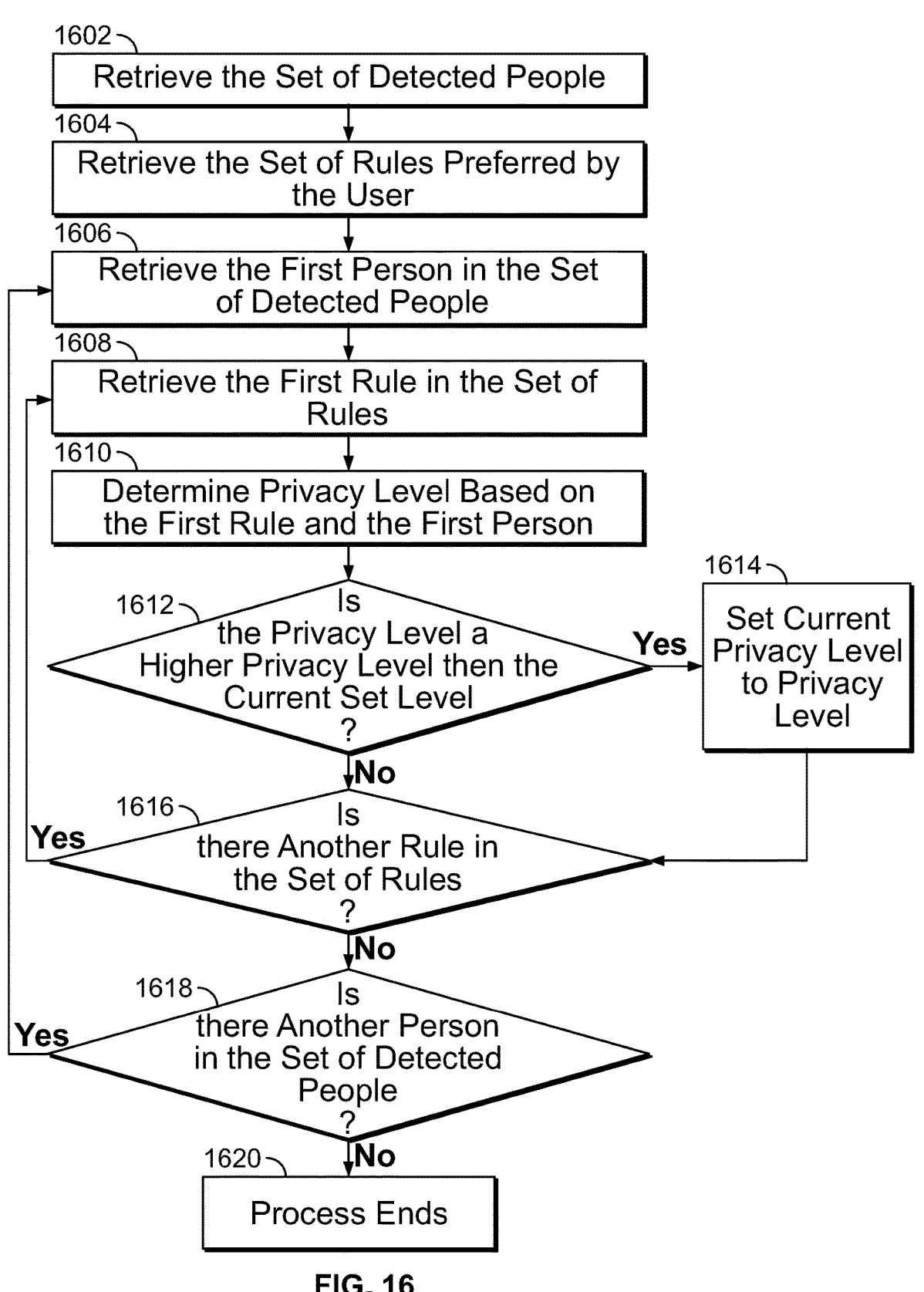
FIG. 16 is a flowchart of illustrative steps involved in determining a privacy level, in accordance with some embodiments of the disclosure.

FIG. 16 is a flowchart an illustrative process 1600 for determining a privacy level, in accordance with some embodiments of the disclosure.

At 1602, control circuitry 504 retrieves the set of detected other users. For example, control circuitry 504 may retrieve the identities of users 106 and 108. Process 1600 proceeds to 1604.

At 1604, control circuitry 504 retrieves the set of rules. The set of rules determine the level of privacy. The set of rules may include specific rules for a level of privacy based on specific identities, rules for a level of privacy based on age or other characteristic of a user, or rules for a level of privacy based on the content of the query or other related information. The rules may be user-generated, created by default, or generated by control circuitry 504 based on monitoring of the user. Process 1600 proceeds to 1606.

At 1606, control circuitry 504 retrieves the first person in the set of detected other users. Process 1600 proceeds to 1608.

At 1608, control circuitry 504 retrieves the first rule in the set of rules. For example, the first rule may be that the level of privacy is high if a user is under the age of 10. Process 1600 proceeds to 1610.

At 1610, control circuitry 504 determines the level of privacy based on the first rule and the first person. For example, control circuitry 504 may compare the age of user 108 to the threshold age indicated in the first rule to determine that the privacy level does not need to be high. Process 1600 proceeds to 1612.

At 1612, control circuitry 504 determines whether the level of privacy is a higher level of privacy then the current set level. For example, if user 108 was below the age threshold and so the first rule required the level of privacy be high, but the current set level of privacy was low, control circuitry 504 would determine that the level did not match. IN another example, if user 108 was above the age threshold, so the first rule did not require that the level of privacy be high, and the current set level of privacy was high, control circuitry 504 may determine that the level of privacy did not match but it would not determine that the level of privacy needed to be increased. The default level of privacy may be set automatically or manually at the time of the original conversation. If control circuitry 504 determines that the level of privacy is a higher level of privacy than the current set level, process 1600 proceeds to 1614. If not, process 1600 proceeds to 1616.

At 1614, control circuitry 504 sets the current privacy level to the determined level of privacy. For example, if the current set level of privacy is low and it was determined that the level of privacy was required to be high, the current privacy level is set to high. Process 1600 proceeds to 1616.

At 1616, control circuitry 504 determines whether there is another rule in the set of rules. If control circuitry 504 determines that there is another rule in the set of rules, process 1600 proceeds to 1608. If not, process 1600 proceeds to 1618.

At 1618, control circuitry 504 determines whether there is another person in the set of detected other users. If control circuitry 504 determines that there is another person in the set of detected other users, process 1600 proceeds to 1606. If not, process 1600 proceeds to 1620. At 1620, process 1600 ends.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 16.

Figure 17:
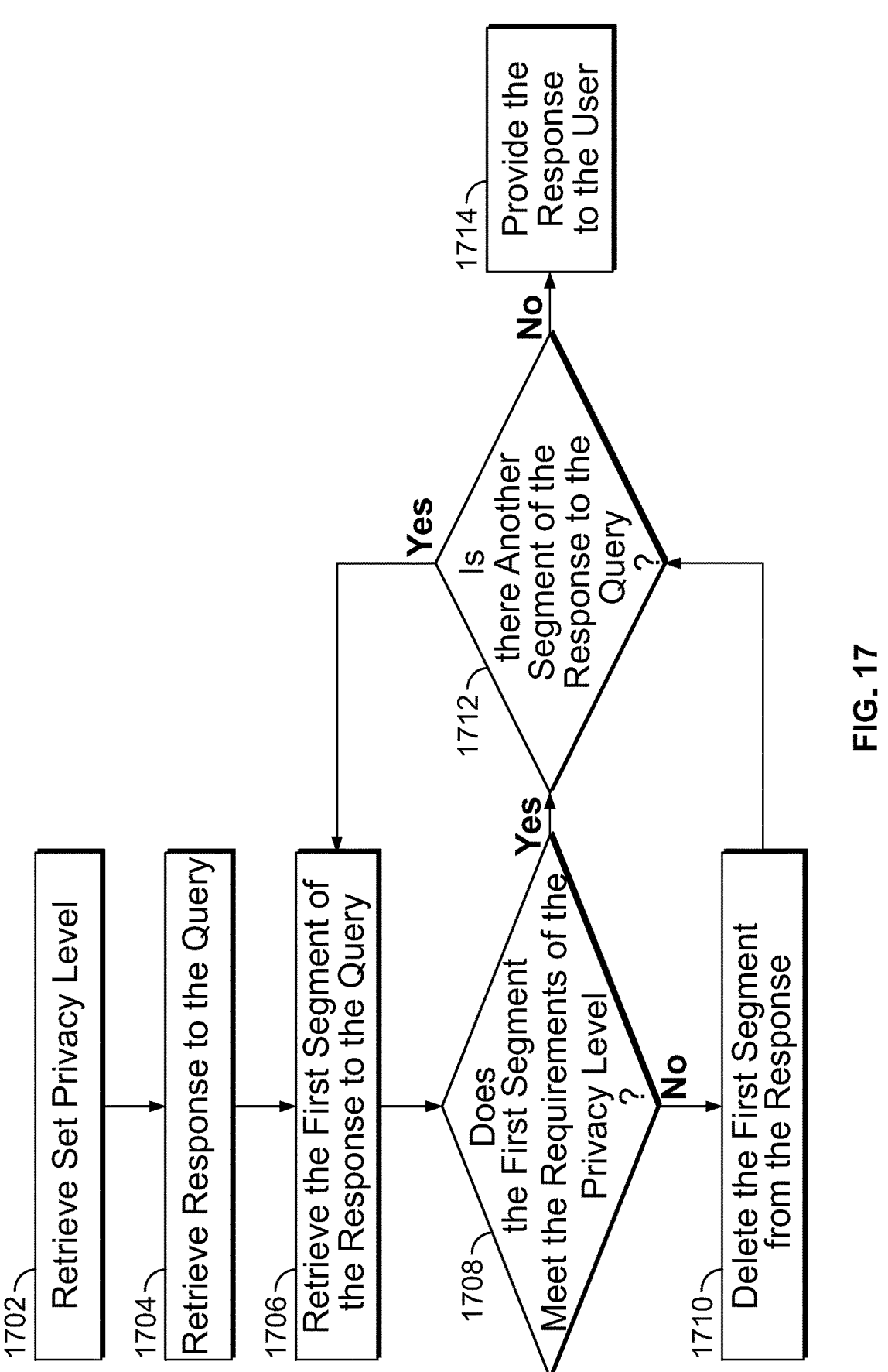
FIG. 17 is a flowchart of illustrative steps involved in providing an appropriate response from the set of responses to the user, in accordance with some embodiments of the disclosure.

FIG. 17 is a flowchart an illustrative process 1700 for providing an appropriate response from the set of responses to the user, in accordance with some embodiments of the disclosure.

At 1702, control circuitry 504 retrieves the set level of privacy. For example, control circuitry 504 may have set the level of privacy to high. Process 1700 proceeds to 1704.

At 1704, control circuitry 504 retrieves the generated response to the query. Process 1700 proceeds to 1706.

At 1706, control circuitry 504 retrieves the first segment of the response to the query. Process 1700 proceeds to 1708.

At 1708, control circuitry 504 determines whether the first segment meets the requirements of the level of privacy. The response may be tagged with a default level of privacy based on the associated template. For example, the segments of "You have plans for dinner" and "on Friday" both meet any requirements of privacy but "and then go home to have sex" does not. In cases where a high level of privacy is required due the presence of a user under a threshold age, the segments of "You have plans for dinner" and "on Friday" meet the requirement but "and then go home to have sex" does not. If control circuitry 504 determines that the first response meets the requirements of the level of privacy, process 1700 proceeds to 1712. If not, process 1700 proceeds to 1710.

At 1710, control circuitry 504 deletes the first segment from the response. For example, the response "You have plans to have dinner on Friday and then go home to have sex" becomes "You have plans to have dinner on Friday" once the segment of "and then go home to have sex" is deleted. Process 1700 proceeds to 1712.

At 1712, control circuitry 504 determines whether there is another response in the set of responses. If control circuitry 504 determines that there is another response in the set of responses, process 1700 proceeds to 1706. If not, process 1700 proceeds to 1714.

At 1714, control circuitry 504 provides the response to the user. Control circuitry 504 may provide the response to a user device for playback. For example, control circuitry 504 may play back response to Joe on Joe's user device.

It is contemplated that the steps or descriptions of FIG. 17 may be used with any other embodiment of this disclosure. In addition, the steps and descriptions described in relation to FIG. 17 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 17.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving a voice utterance;

storing in a data structure an entry that comprises, for the voice utterance: (a) a recorded audio portion of the conversation associated with the utterance or a set of words extracted from the recorded audio portion of the conversation associated with the voice utterance, (b) a first list of users in a vicinity of the voice utterance, (c) a set of keywords associated with the voice utterance, and (d) at least one link to supplemental information corresponding to the set of keywords;

receiving a voice query;

creating a second list of users in a vicinity of the voice query;

based on determining that the voice utterance was requested by the voice query:

based on the second list of users in the vicinity of the voice query being a subset of the first list of users in the vicinity of the voice utterance causing an output of the voice utterance;

based on the second list of users comprising both: (a) at least one user from the first list of users in the vicinity of the voice utterance, and (b) at least one additional user:

determining a level of privacy based on at least one rule that uses an identity of the at least one additional user as a criteria; and causing an output of a modified voice utterance, wherein the voice utterance is modified based on the determined level of privacy and wherein the causing the output further comprises providing the at least one link to supplemental information;

based on the second list of users not including any of the users from the first list of users in the vicinity of the voice utterance: preventing an output of any portion of the voice utterance.

2. The method of claim 1, further comprising:

recording the voice query, processing the voice query into a set of words;

storing in a data structure an entry that comprises, for the voice query: (a) the recorded voice query and (b) the set of words; and determining the level of privacy based on whether the set of words meets a set of rules.

3. The method of claim 1, wherein the determining the level of privacy further comprises determining the level of privacy based on whether any of the at least one additional user is below an age threshold.

4. A system comprising:

input/output circuitry configured to:

receive a voice utterance; and control circuitry configured to:

store in a data structure an entry that comprises, for the voice utterance: (a) a recorded audio portion of the conversation associated with the utterance or a set of words extracted from the recorded audio portion of the conversation associated with the voice utterance, (b) a first list of users in a vicinity of the voice utterance, (c) a set of keywords associated with the voice utterance, and (d) at least one link to supplemental information corresponding to the set of keywords;

wherein the input/output circuitry is further configured to:

receive a voice query; and wherein the control circuitry is further configured to:

create a second list of users in a vicinity of the voice query;

based on determining that the voice utterance was requested by the voice query:

based on determining that the second list of users in the vicinity of the voice query is a subset of the first list of users in the vicinity of the voice utterance: cause an output, via the input/output circuitry, of the-voice utterance;

based on determining that the second list of users comprises both: (a at least one user from the first list of users in the vicinity of the voice utterance, and (b) at least one additional user:

determine a level of privacy based on at least one rule that uses an identity of the at least one additional user as a criteria; and cause an output, via the input/output circuitry, of a modified voice utterance, wherein the voice utterance is modified based on the determined level of privacy and wherein the causing the output further comprises providing the at least one link to supplemental information;

based on determining that the second list of users does not include any of the users from the first list of users in the vicinity of the voice utterance: prevent an output, via the input/output circuitry, of any portion of the voice utterance.

5. The system of claim 4, wherein the control circuitry is further configured to:

record the voice query, process the voice query into a set of words;

store in a data structure an entry that comprises, for the voice query: (a) the recorded voice query and (b) the set of words; and determine the level of privacy based on whether the set of words meets a set of rules.

6. The system of claim 4, wherein the control circuitry is further configured to:

determine the level of privacy based on whether any of the at least one additional user is below an age threshold.

* * * * *